(12) United States Patent
Muramatsu et al.

(10) Patent No.: US 12,202,066 B2
(45) Date of Patent: Jan. 21, 2025

(54) FRICTION STIR SPOT WELDING APPARATUS AND JOINT STRUCTURE

(71) Applicant: KAWASAKI JUKOGYO KABUSHIKI KAISHA, Kobe (JP)

(72) Inventors: Yoshitaka Muramatsu, Kobe (JP); Masahiro Miyake, Kobe (JP); Ryoji Ohashi, Kobe (JP); Naoki Takeoka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 64 days.

(21) Appl. No.: 17/928,461

(22) PCT Filed: May 27, 2021

(86) PCT No.: PCT/JP2021/020157
§ 371 (c)(1),
(2) Date: Nov. 29, 2022

(87) PCT Pub. No.: WO2021/241674
PCT Pub. Date: Dec. 2, 2021

(65) Prior Publication Data
US 2023/0211434 A1    Jul. 6, 2023

(30) Foreign Application Priority Data
May 29, 2020   (JP) .................... 2020-094145

(51) Int. Cl.
*B23K 20/00* (2006.01)
*B23K 20/12* (2006.01)

(52) U.S. Cl.
CPC .......... *B23K 20/125* (2013.01); *B23K 20/124* (2013.01); *B23K 20/126* (2013.01)

(58) Field of Classification Search
CPC .............. B23K 20/1255; B23K 20/126; B23K 20/125; B23K 20/122; B23K 20/123; B23K 20/1245
See application file for complete search history.

(56) References Cited

U.S. PATENT DOCUMENTS

| | | | | |
|---|---|---|---|---|
| 11,084,121 | B2* | 8/2021 | Hirano | B23K 20/1225 |
| 11,179,799 | B2* | 11/2021 | Hirano | B23K 20/122 |
| 2003/0209588 | A1* | 11/2003 | Colligan | B23K 20/1255 |
| | | | | 228/2.1 |

(Continued)

FOREIGN PATENT DOCUMENTS

| | | |
|---|---|---|
| JP | 2003-320465 A | 11/2003 |
| JP | 2005-211971 A | 8/2005 |

(Continued)

*Primary Examiner* — Erin B Saad
(74) *Attorney, Agent, or Firm* — Oliff PLC

(57) ABSTRACT

A friction stir spot welding apparatus includes a pin member formed in a solid cylindrical shape, a shoulder member formed in a hollow cylindrical shape, the pin member being inserted in the shoulder member, a rotary actuator that rotates the pin member and the shoulder member on an axis that is in agreement with an axial center of the pin member, and a linear actuator that linearly moves each of the pin member and the shoulder member along the axis. A tip-end part of the shoulder member is formed in a tapered shape.

9 Claims, 12 Drawing Sheets

(56) References Cited

U.S. PATENT DOCUMENTS

| | | | | |
|---|---|---|---|---|
| 2007/0152015 A1* | 7/2007 | Burton | ............... | B23K 20/1265 |
| | | | | 228/2.1 |
| 2012/0125522 A1 | 5/2012 | Kato et al. | | |
| 2014/0069986 A1 | 3/2014 | Okada et al. | | |
| 2019/0070692 A1 | 3/2019 | Haruna et al. | | |
| 2020/0206839 A1* | 7/2020 | Hirano | ................ | B23K 20/126 |
| 2021/0086291 A1* | 3/2021 | Okada | ................ | B23K 20/1255 |
| 2021/0316391 A1* | 10/2021 | Miyake | .............. | B23K 20/1255 |
| 2021/0331421 A1* | 10/2021 | Okada | ................ | B29C 66/8322 |
| 2023/0211434 A1* | 7/2023 | Muramatsu | ........ | B23K 20/1255 |
| | | | | 228/2.1 |

FOREIGN PATENT DOCUMENTS

| | | | |
|---|---|---|---|
| JP | 2006-061921 A | 3/2006 | |
| JP | 2012-196682 A | 10/2012 | |
| JP | 2017-164788 A | 9/2017 | |
| KR | 10-2013-0122028 A | 11/2013 | |

* cited by examiner

FRICTION STIR SPOT WELDING APPARATUS AND JOINT STRUCTURE

CROSS-REFERENCE TO RELATED APPLICATIONS

This is a National Phase application of International Application No. PCT/JP2021/020157 filed May 27, 2021, which claims priority to Japanese Patent Application No. 2020-094145 filed on May 29, 2020.

TECHNICAL FIELD

The present disclosure relates to a friction stir spot welding apparatus and a joint structure.

BACKGROUND ART

In transport vehicles, such as automobiles, railroad vehicles, and airplanes, resistance spot welding or rivet connection is used when coupling metals. However, in recent years, a method of joining metals using frictional heat (friction stir spot welding method) has attracted the attention (for example, see Patent Document 1).

In the friction stir spot welding method disclosed in Patent Document 1, a substantially circular pillar-shaped pin member, and a substantially cylindrical shoulder member which is hollow in order to insert the pin member therein, are used for joining objects to be joined, and a tool actuator which operates (drives) the pin member and the shoulder member (tool) is controlled as illustrated below.

That is, where a cross-sectional area of a tip-end surface of the pin member is Ap, a cross-sectional area of a tip-end surface of the shoulder member is As, a pressed-in depth when the pin member is pressed into the surface of the to-be-joined object is Pp, and a pressed-in depth when the shoulder member is pressed into the surface of the to-be-joined object is Ps, the tool actuator is controlled so that an absolute value of a tool mean position Tx defined by Ap·Pp+As·Ps=Tx becomes smaller.

Therefore, a good joining quality with suitable accuracy can be realized according to welding conditions, and generation of an internal cavity defect can be prevented or suppressed.

REFERENCE DOCUMENT(S) OF CONVENTIONAL ART

Patent Document

[Patent Document 1] JP2012-196682A

DESCRIPTION OF THE DISCLOSURE

Problem(s) to be Solved by the Disclosure

Meanwhile, according to the friction stir spot welding method disclosed in Patent Document 1 described above, since the surface of the to-be-joined object is smoothed, the present inventors cannot judge an abrasion state of the tool from the surface of the to-be-joined object after the joining is finished. Thus, it is necessary to periodically remove the tool from an apparatus to inspect the abrasion state of the tool.

One purpose of the present disclosure is to provide a friction stir spot welding apparatus and a joint structure, which allow a judgment of an abrasion state of a tool from a joining spot of an object to be joined (the surface of a joining part).

Means for Solving the Problem(s)

In order to achieve the above purpose, a friction stir spot welding apparatus according to the present disclosure is a friction stir spot welding apparatus that joins a to-be-joined object by softening the object with frictional heat, which includes a pin member formed in a solid cylindrical shape, a shoulder member formed in a hollow cylindrical shape, the pin member being inserted in the shoulder member, a rotary actuator that rotates the pin member and the shoulder member on an axis that is in agreement with an axial center of the pin member, and a linear actuator that linearly moves each of the pin member and the shoulder member along the axis. A tip-end part of the shoulder member is formed in a tapered shape.

Thus, if the wear does not occur in the tip-end part of the shoulder member, the shape of the tip-end part is stamped onto (transferred to) the surface of the to-be-joined object when carrying out the friction stir spot welding of the to-be-joined object. On the other hand, if the wear occurs in the tip-end part of the shoulder member, the shape of the tip-end part is not stamped onto the surface of the to-be-joined object, but the surface becomes flat.

Thus, by inspecting (visually inspecting) the surface of the to-be-joined object after the friction stir spot welding is finished, one can judge whether the tip-end part of the shoulder member is worn.

Further, a joint structure according to the present disclosure is a joint structure formed by a friction stir spot welding apparatus carrying out friction stir spot welding of a to-be-joined object including a first member and a second member at a joining part. The first member is made of material with a melting point lower than the second member. The first member and the second member are disposed in this order. An annular recess is formed in the surface of the joining part. A bottom surface of the recess is inclined, curved, or bent.

Thus, by inspecting (visually inspecting) the surface of the to-be-joined object after the friction stir spot welding is finished, one can judge whether the tip-end part of the shoulder member is worn.

The above-described purpose, other purposes, features, and advantages of the present disclosure will be made clear by the detailed description of preferred embodiments below, with reference to accompanying drawings.

Effect of the Disclosure

According to the friction stir spot welding apparatus and the joint structure of the present disclosure, an abrasion state of a tool can be judged based on the joining spot of the to-be-joined object (the surface of the joining part).

MODES FOR CARRYING OUT THE DISCLOSURE

Figure 1:
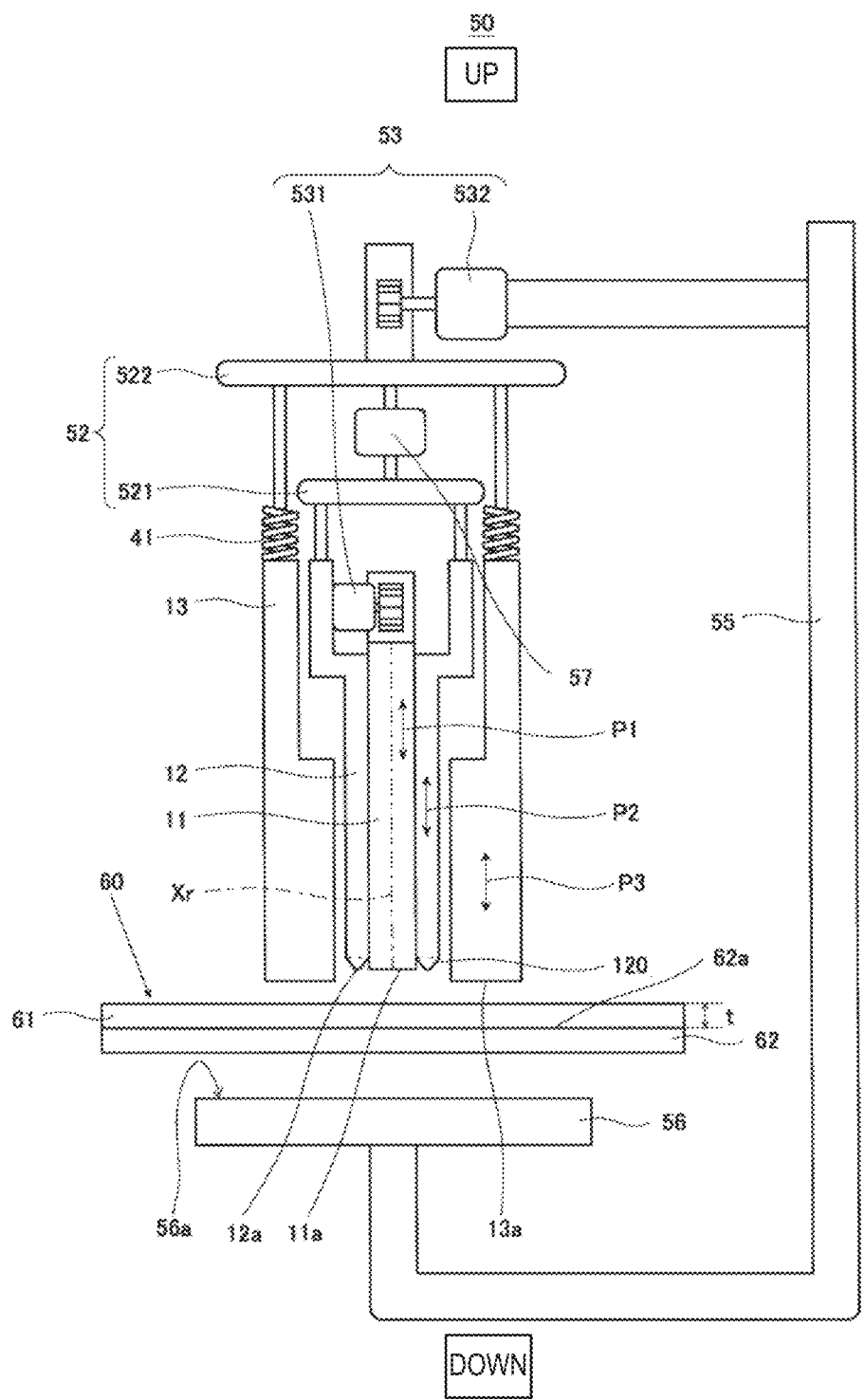
FIG. 1 is a schematic diagram illustrating an outline configuration of a friction stir spot welding apparatus according to Embodiment 1.

Hereinafter, desirable embodiments of the present disclosure will be described with reference to the drawings. Note that, below, the same reference characters are assigned to the same or corresponding elements throughout the drawings to omit redundant explanation. Further, throughout the drawings, components which are necessary to explain the present disclosure are selectively illustrated, and illustration of other components may be omitted. Moreover, the present disclosure is not limited to the following embodiments.

Embodiment 1

Below, one example of a friction stir spot welding apparatus according to Embodiment 1 is described in detail with reference to the drawings.

[Configuration of Friction Stir Spot Welding Apparatus]

FIG. 1 is a schematic diagram illustrating an outline configuration of the friction stir spot welding apparatus according to Embodiment 1. Note that, in FIG. 1, an up-and-down direction in this drawing is expressed as an up-and-down direction of the friction stir spot welding apparatus.

As illustrated in FIG. 1, a friction stir spot welding apparatus 50 according to Embodiment 1 includes a pin member 11, a shoulder member 12, a tool fixator 52, a linear actuator 53, a clamp member 13, a backing support part 55, a backing member 56, and a rotary actuator 57.

The pin member 11, the shoulder member 12, the tool fixator 52, the linear actuator 53, the clamp member 13, and the rotary actuator 57 are provided to an upper end of the backing support part 55 which is comprised of a C-shaped gun (C-shaped frame). The backing member 56 is provided to a lower end of the backing support part 55. The pin member 11, the shoulder member 12, the clamp member 13, and the backing member 56 are attached to the backing support part 55 so that the pin member 11, the shoulder member 12, and the clamp member 13 are located at a position opposing to the backing member 56. Note that an object 60 to be joined (to-be-joined object 60) is disposed between the pin member 11, the shoulder member 12, and the clamp member 13, and the backing member 56.

The pin member 11, the shoulder member 12, and the clamp member 13 are fixed to the tool fixator 52 which is comprised of a rotary tool fixator 521 and a clamp fixator 522. In detail, the pin member 11 and the shoulder member 12 are fixed to the rotary tool fixator 521, and the clamp member 13 is fixed to the clamp fixator 522 via a clamp actuator 41. Further, the rotary tool fixator 521 is supported by the clamp fixator 522 via the rotary actuator 57. Note that the clamp actuator 41 is comprised of a spring.

Further, the pin member 11, the shoulder member 12, and the clamp member 13 are linearly moved in the up-and-down direction by the linear actuator 53 which is comprised of a pin actuator 531 and a shoulder actuator 532.

The pin member 11 is formed in a solid cylindrical shape, and although not illustrated in detail in FIG. 1, it is supported by the rotary tool fixator 521. Moreover, the pin member 11 is configured to be rotatable by the rotary actuator 57 on an axis Xr (rotation axis) which is in agreement with the axial center of the pin member 11, and to be linearly movable by the pin actuator 531 in an arrow P1 direction (in FIG. 1, the up-and-down direction), i.e., the axis Xr direction.

Note that the pin actuator 531 may be comprised of a linear actuator, for example. The linear actuator may be comprised of a servomotor and a rack-and-pinion mechanism, or a servomotor and a ball-screw mechanism, or an air cylinder, for example.

The shoulder member 12 is formed in a hollow cylindrical shape, and is supported by the rotary tool fixator 521. The pin member 11 is inserted in the hollow shoulder member 12. In other words, the shoulder member 12 is disposed so as to surround an outer circumferential surface of the pin member 11.

Moreover, the shoulder member 12 is configured to be rotatable by the rotary actuator 57 on the axis Xr same as the pin member 11, and to be linearly movable by the shoulder actuator 532 in an arrow P2 direction, i.e., the axis Xr direction.

Note that the shoulder actuator 532 may be comprised of a linear actuator, for example. The linear actuator may be comprised of a servomotor and a rack-and-pinion mechanism, or a servomotor and a ball-screw mechanism, or an air cylinder, for example.

Thus, in this embodiment, both the pin member 11 and the shoulder member 12 (rotary tool) are supported by the same rotary tool fixator 521, and are rotated by the rotary actuator 57 integrally on the axis Xr. Further, the pin member 11 and the shoulder member 12 are configured to be linearly movable by the pin actuator 531 and the shoulder actuator 532, respectively, in the axis Xr direction.

Note that, although in Embodiment 1 the pin member 11 is linearly movable alone and is also linearly movable in association with the linear movement of the shoulder member 12, the pin member 11 and the shoulder member 12 may be configured to be linearly movable independently.

Similarly to the shoulder member 12, the clamp member 13 is formed in a hollow cylindrical shape, and it is provided so that its axial center is in agreement with the axis Xr. The shoulder member 12 is inserted into the hollow clamp member 13.

That is, the cylindrical shoulder member 12 is disposed so as to surround the outer circumferential surface of the pin member 11, and the cylindrical clamp member 13 is disposed so as to surround an outer circumferential surface of the shoulder member 12. In other words, the clamp member 13, the shoulder member 12, and the pin member 11 have a coaxial telescopic structure.

Further, the clamp member 13 is configured so as to press the to-be-joined object 60 from one of the surfaces (upper surface). As described above, in Embodiment 1, the clamp member 13 is supported by the clamp fixator 522 via the clamp actuator 41. The clamp actuator 41 is configured to bias the clamp member 13 toward the backing member 56. Further, the clamp member 13 (including the clamp actuator 41 and the clamp fixator 522) is configured to be linearly movable by the shoulder actuator 532 in an arrow P3 direction (the same direction as the arrow P1 and the arrow P2).

Note that, although in Embodiment 1 the clamp actuator 41 is comprised of the spring, it is not limited to this configuration. The clamp actuator 41 may be any configuration as long as it biases or applies a pressing force to the clamp member 13, and, for example, a mechanism using gas pressure, oil pressure, a servomotor, etc. may also be conveniently used as the clamp actuator 41.

The pin member 11, the shoulder member 12, and the clamp member 13 are provided with a tip-end surface 11a, a tip-end surface 12a, and a tip-end surface 13a, respectively. Further, the tip-end surface 11a of the pin member 11 and the tip-end surface 12a of the shoulder member 12 are configured to be in agreement with each other, when seen horizontally.

Moreover, the pin member 11, the shoulder member 12, and the clamp member 13 are linearly moved by the linear actuator 53 so that the tip-end surface 11a, the tip-end surface 12a, and the tip-end surface 13a each contact the upper surface of the to-be-joined object 60 (a joining part of the to-be-joined object 60) and press the to-be-joined object 60.

A tip-end part 120 of the shoulder member 12 is formed in a tapered shape. Here, the shape of the tip-end part 120 of the shoulder member 12 is described in detail with reference to FIG. 2.

Figure 2:
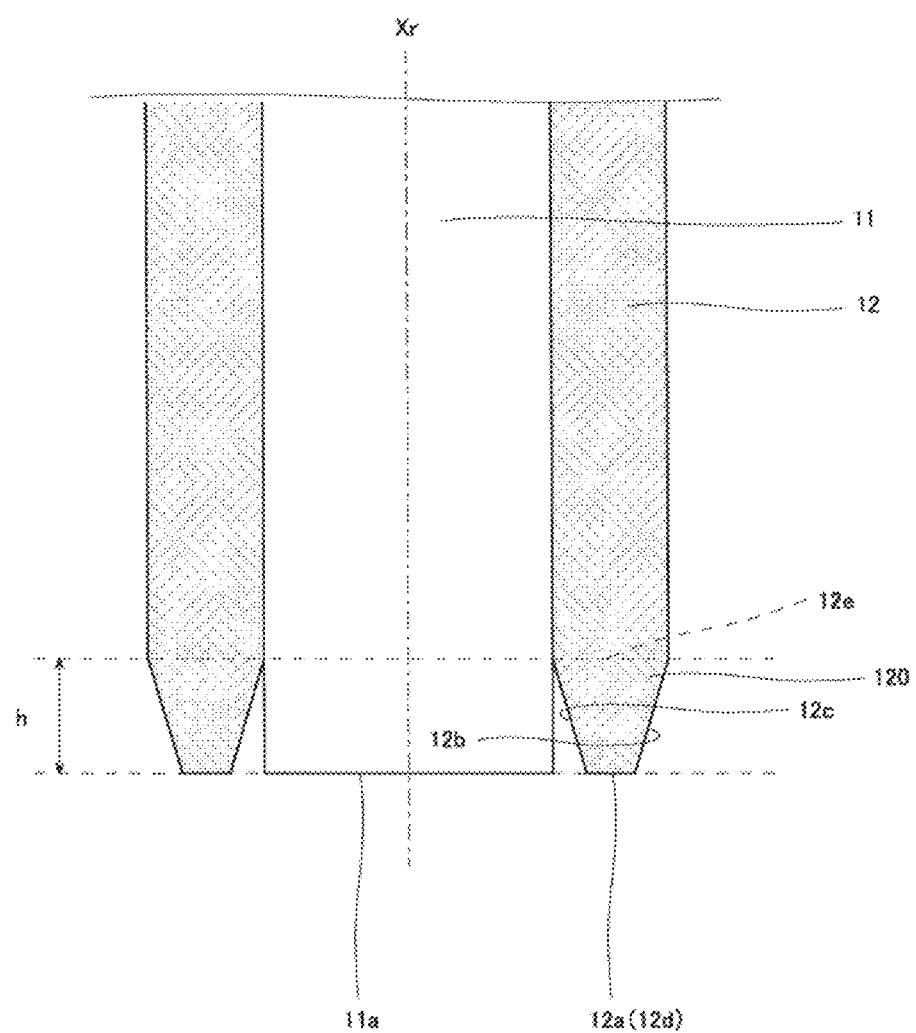
FIG. 2 is a schematic diagram in which a substantial part of the friction stir spot welding apparatus illustrated in FIG. 1 is enlarged.

FIG. 2 is a schematic diagram in which a substantial part of the friction stir spot welding apparatus illustrated in FIG. 1 is enlarged.

As illustrated in FIG. 2, in Embodiment 1, the tip-end part 120 is formed so that an outer circumferential surface 12b and an inner circumferential surface 12c of the shoulder member 12 incline to the axis Xr. In other words, the tip-end part 120 is formed so that its cross-sectional shape in the axis Xr direction is substantially V-shaped (substantially U-shaped), when seen horizontally.

Further, the tip-end part 120 is a part (area) from the tip-end surface 12a of the shoulder member 12 to a given height h. In terms of stamping (transferring) the shape of the tip-end part 120 onto the surface of the to-be-joined object 60, the height h may be 0.05 mm or more, or may be 5% or more of the thickness of a first member 61, for example. Further, in terms of suppressing damage to the tip-end part 120 of the shoulder member 12, the height h may be 0.5 mm or less, or may be 50% or less of the thickness of the first member 61, for example.

Note that the tip-end part 120 may be formed so that its radial cross-sectional area becomes smaller as it goes toward the tip end. Further, as for the tip-end part 120, the shapes of the outer circumferential surface 12b and the inner circumferential surface 12c of the tip-end part 120 may be any kind of shapes, as long as the area of a tip end 12d (the tip-end surface 12a) of the tip-end part 120 is smaller than the radial cross-sectional area of a base end 12e of the tip-end part 120.

As illustrated in FIG. 1, in Embodiment 1, the backing member 56 is configured to support the back surface (lower surface) of the to-be-joined object 60 of a flat plate shape so as to contact the back surface by a flat surface (support surface 56a). The configuration of the backing member 56 is not limited in particular, as long as it can appropriately support the to-be-joined object 60 to carry out friction stir joining or welding. For example, as for the backing member 56, a plurality of shapes may be prepared separately, and it may be configured to be removable from the backing support part 55 and replaceable according to the type of the to-be-joined object 60.

The to-be-joined object 60 has two plate-like members, the first member 61 and a second member 62. The first member 61 is disposed so as to oppose to the pin member 11 and the shoulder member 12, and is made of material with a melting point lower than the second member 62.

Note that, as for the to-be-joined object 60, a third member may be disposed between the first member 61 and the second member 62. The third member may be made of metal (for example, aluminum, aluminum alloy, or magnesium alloy), or may be sealant material, for example. The sealant material may be sealing material or adhesive. As the sealant material, polysulfide-based synthetic rubber, natural rubber, synthetic rubber, such as silicone rubber and fluororubber, and synthetic resin, such as tetrafluoroethylene rubber resin, for example.

For the first member 61, at least one material among metals (for example, aluminum, aluminum alloy, and magnesium alloy), thermoplastics (for example, polyamide), and fiber-reinforced plastics (for example, carbon-fiber-reinforced plastics) may be used. As the aluminum alloy, various kinds of aluminum alloys may be used, and, for example, Al—Mg—Si based alloy (A6061) may be used, or Al—Si—Mg based alloy (AC4C) may be used.

Further, for the second member 62, metal (for example, steel or titanium) may be used. As the steel, various kinds of steels may be used, and soft steel or high-strength steel may be used. Further, on the surface of steel, an oxide film may be formed, or a deposit or plating layer (for example, galvanization) may be formed. A steel plate where galvanization is formed may be a hot-dip galvanized steel plate (GI steel plate), an alloyed hot-dip galvanized steel plate (GA steel plate), a Galvalume® steel plate, or an aluminum-silicon-coated hot-stamped steel plate. Further, the thickness of the deposit may be 2 micrometers to 50 micrometers.

Note that, although in Embodiment 1 the to-be-joined object 60 is comprised of the plate-like first member 61 and the plate-like second member 62, it is not limited to this configuration. The shape of the to-be-joined object 60 (the first member 61 and the second member 62) is arbitrary, and, for example, it may be a rectangular parallelepiped shape, or may be formed circularly. Similarly, the shape of the third member is also arbitrary, and, for example, it may be a plate shape, or may be a rectangular parallelepiped shape, or may be formed circularly.

Further, in Embodiment 1, the concrete configurations of the pin member 11, the shoulder member 12, the tool fixator 52, the linear actuator 53, the clamp member 13, the backing support part 55, and the rotary actuator 57 are not limited to the configurations described above, but they may conveniently use widely-known configurations in the friction stir welding field. For example, the pin actuator 531 and the shoulder actuator 532 may be comprised of a motor and gear mechanism etc. which is known in the friction stir welding field.

Although in Embodiment 1 the backing support part 55 is comprised of the C-shaped gun, it is not limited to this configuration. The backing support part 55 may be configured in any way, as long as it can support the pin member 11, the shoulder member 12, and the clamp member 13 so as to be linearly movable, and can support the backing member 56 at the position which opposes to the pin member 11, the shoulder member 12, and the clamp member 13.

Further, although in Embodiment 1 the clamp member 13 is provided, it is not limited to this configuration, but the clamp member 13 may not be provided. In this case, for example, the clamp member 13 may be configured to be detachable from and attachable to the backing support part 55, as needed.

Further, in the friction stir spot welding apparatus 50 according to Embodiment 1, it is disposed at a robot device for friction stir spot welding (not illustrated). In detail, the backing support part 55 is attached to a tip end of an arm of the robot device.

Thus, the backing support part 55 may also be considered to be included in the robot device for friction stir spot welding. The concrete configuration of the robot device for friction stir spot welding, including the backing support part 55 and the arm, is not limited in particular, but it may conveniently use a configuration known in the friction stir welding field, such as articulated robots.

Note that the friction stir spot welding apparatus 50 (including the backing support part 55) is not limited to the case where it is applied to the robot device for friction stir spot welding, and, for example, it can also be suitably applied to known machining apparatuses, such as NC machine tools, large-sized C-frames, and auto riveters.

Further, as for the friction stir spot welding apparatus 50 according to Embodiment 1, two or more pairs of robots may be configured so that the backing member 56 opposes to a part of the friction stir spot welding apparatus 50 other than the backing member 56. Moreover, as long as the friction stir spot welding apparatus 50 can stably perform the friction stir spot welding to the to-be-joined object 60, the to-be-joined object 60 may be of a hand-held type, or the robot may be used as a positioner for the to-be-joined

[Control Configuration of Friction Stir Spot Welding Apparatus]

Figure 3:
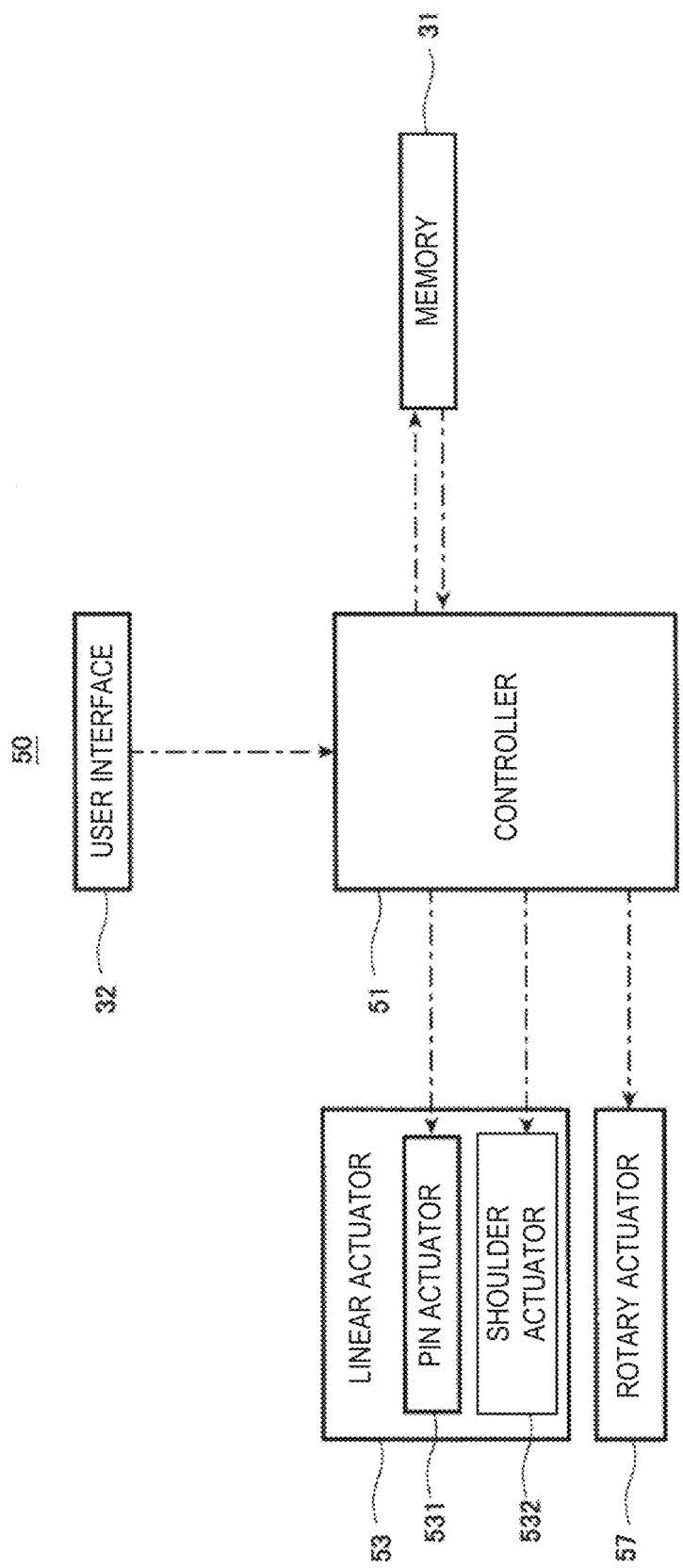
FIG. 3 is a block diagram schematically illustrating a control configuration of the friction stir spot welding apparatus illustrated in FIG. 1.

Next, a control configuration of the friction stir spot welding apparatus 50 according to Embodiment 1 is described concretely with reference to FIG. 3.

FIG. 3 is a block diagram schematically illustrating the control configuration of the friction stir spot welding apparatus illustrated in FIG. 1.

As illustrated in FIG. 3, the friction stir spot welding apparatus 50 includes a controller 51, a memory 31, a user interface 32, and a position detector 33.

The controller 51 is comprised of a microprocessor, a CPU, etc., and is configured to control each member (each apparatus) which constitutes the friction stir spot welding apparatus) 50. In detail, the controller 51 controls the pin actuator 531 and the shoulder actuator 532 which constitute the linear actuator 53, and the rotary actuator 57, by reading and executing software, such as a basic program, stored in the memory.

Therefore, switching between advancing and retreating of the pin member 11 and the shoulder member 12, a control of the tip-end positions of the pin member 11 and the shoulder member 12 during the linear movement (advancing and retreating), a moving speed, a moving direction, etc. are controllable. Further, a pressing force of the pin member 11, the shoulder member 12, and the clamp member 13 for pressing the to-be-joined object 60 is controllable. In addition, a rotational speed of the pin member 11 and the shoulder member 12 is controllable.

Note that the controller 51 may be a sole controller 51 which carries out a centralized control, or may be comprised of a plurality of controllers 51 which collaboratively carry out a distributed control. Further, the controller 51 may be comprised of a microcomputer, or may be comprised of an MPU, a PLC (Programmable Logic Controller), a logical circuit, etc.

The memory 31 stores the basic program and various data possible so that the basic program and various data can be read out, and it is comprised of a known storage device, such as a memory and a hard disk drive. The memory 31 does not need to be a single memory, but it may be comprised of a plurality of storage devices (for example, a random-access memory and a hard disk drive). If the controller 51 etc. is comprised of the microcomputer, at least a part of the memory 31 may be configured as an internal memory of the microcomputer, or it may be configured as an independent memory.

Note that it is needless to say that data may be stored in the memory 31, the data may be readable by devices other than the controller 51, and it may be writable by the controller 51 etc.

The user interface 32 enables an input of various parameters related to the control of the friction stir spot welding, or other data etc. to the controller 51, and is comprised of a known input device, such as a keyboard, a touch panel, and a button switch group. In Embodiment 1, at least welding conditions of the to-be-joined object 60 (for example, data such as the thickness and the material of the to-be-joined object 60) can be inputted via the user interface 32.

The position detector 33 is configured to detect positional information on the tip end (the tip-end surface 12a) of the shoulder member 12, and output the detected positional information to the controller 51. As the position detector 33, a displacement sensor, an LVDT, an encoder, etc. may be used, for example.

[Operation (Operating Method) of Friction Stir Spot Welding Apparatus]

Figure 4:
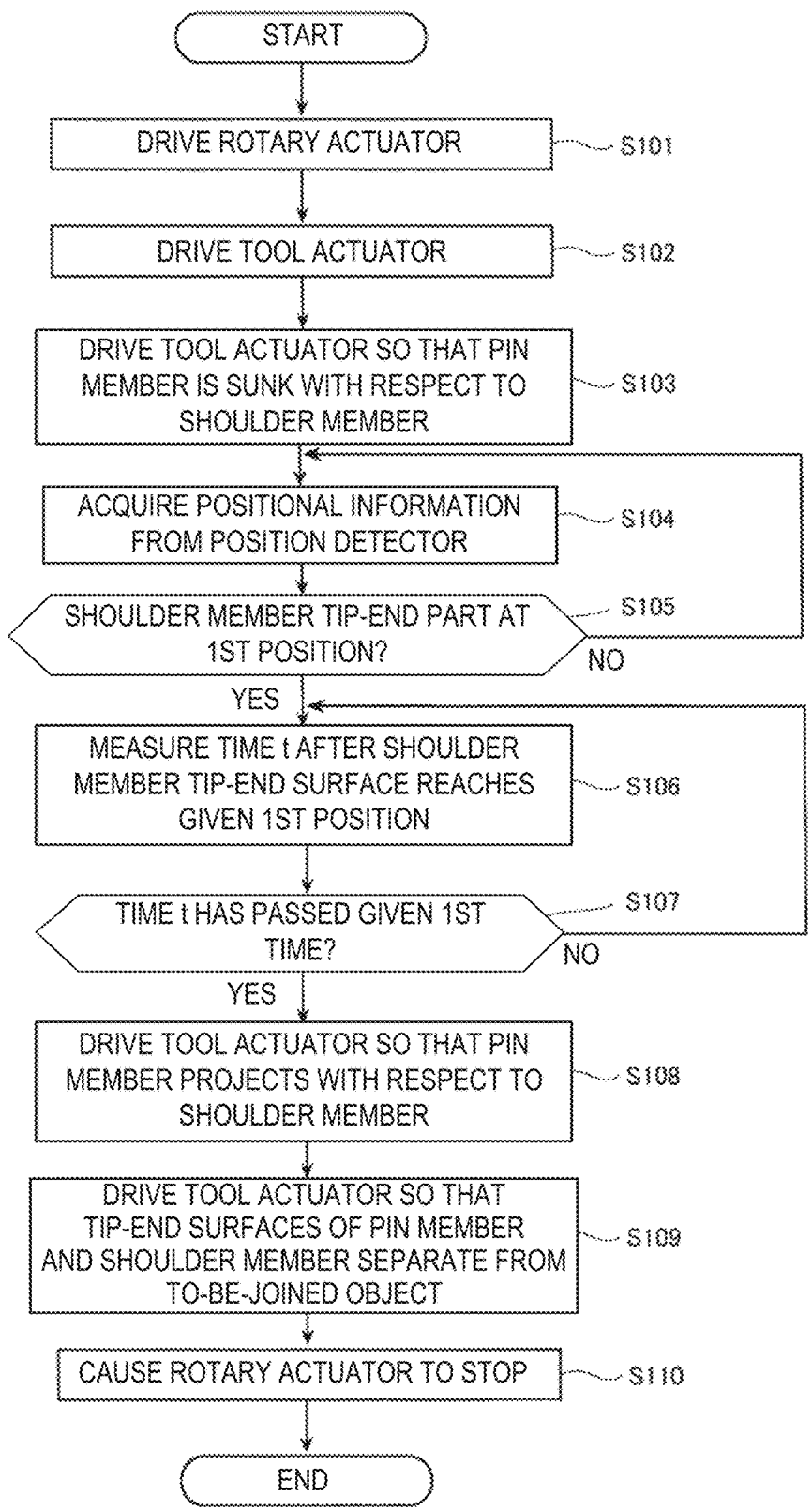
FIG. 4 is a flowchart illustrating one example of operation of the friction stir spot welding apparatus according to Embodiment 1.
Figure 5A:
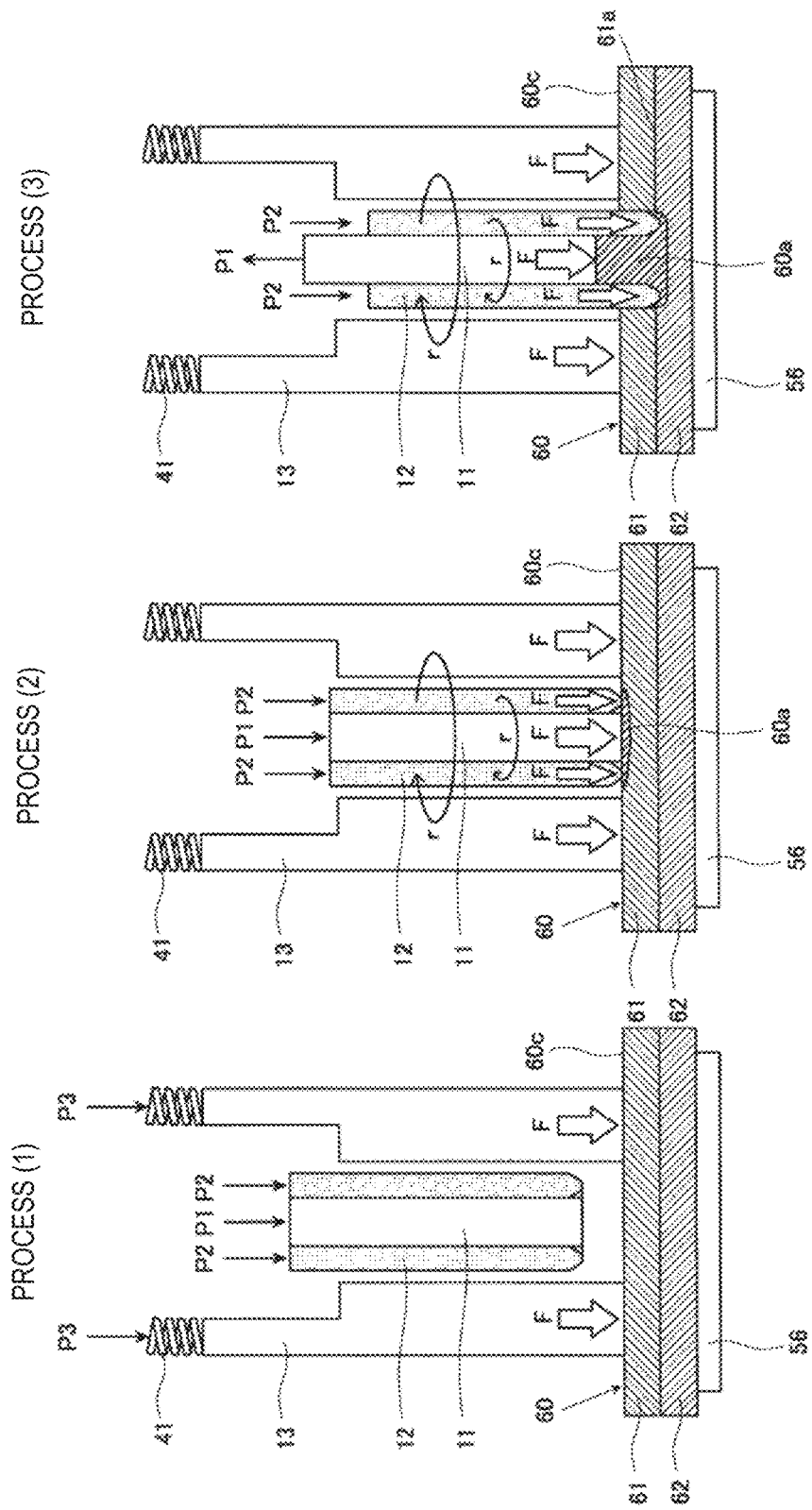
FIG. 5A is a process chart schematically illustrating one example of each process of friction stir spot welding by the friction stir spot welding apparatus illustrated in FIG. 1.
Figure 5B:
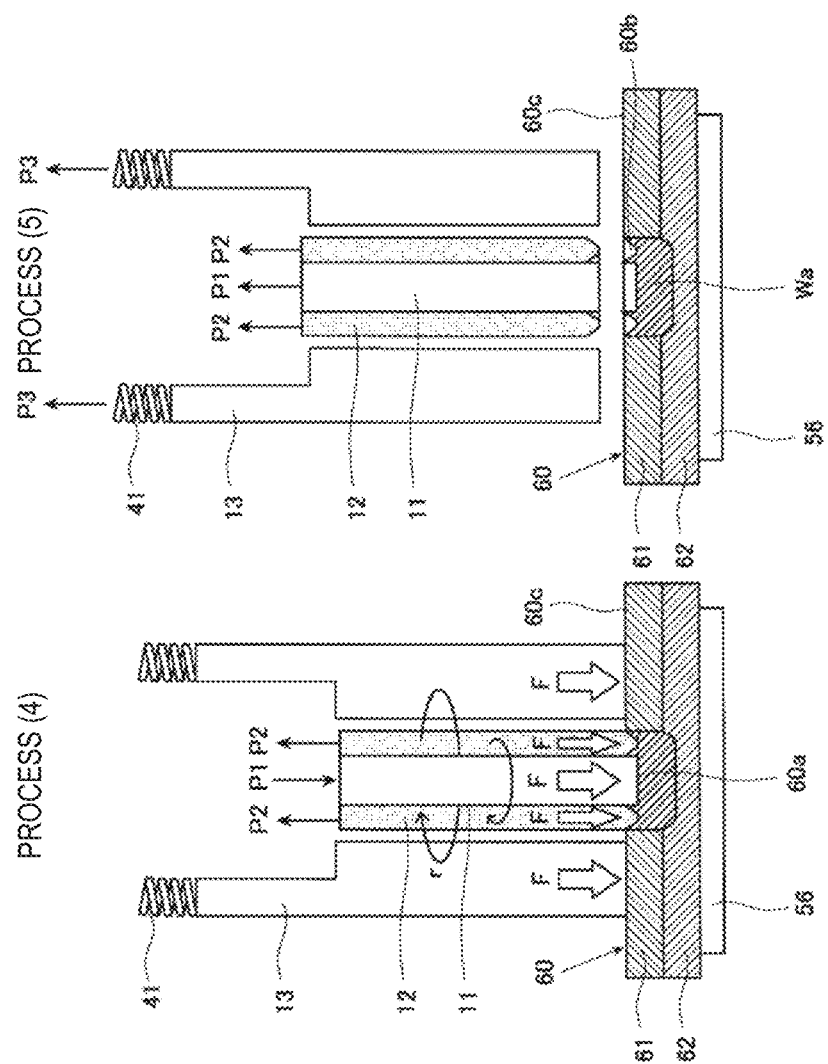
FIG. 5B is a process chart schematically illustrating one example of each process of the friction stir spot welding by the friction stir spot welding apparatus illustrated in FIG. 1.

Next, operation of the friction stir spot welding apparatus 50 according to Embodiment 1 is described concretely with reference to FIGS. 4, 5A, and 5B. Note that, in FIGS. 5A and 5B, one example in which the first member 61 and the second member 62 are used as the to-be-joined object 60 and these members are coupled by spot welding in a stacked state is illustrated.

FIG. 4 is a flowchart illustrating one example of operation of the friction stir spot welding apparatus according to Embodiment 1. FIGS. 5A and 5B are process charts schematically illustrating one example of each process of the friction stir spot welding by the friction stir spot welding apparatus illustrated in FIG. 1.

Note that, in FIGS. 5A and 5B, a part of the friction stir spot welding apparatus is omitted, an arrow r indicates a rotating direction of the pin member 11 and the shoulder member 12, and a block arrow F indicates a direction of a force applied to each of the first member 61 and the second member 62. Further, although a force is also applied from the backing member 56 to each of the first member 61 and the second member 62, it is not illustrated in FIGS. 5A and 5B for convenience of the explanation. Further, in order to clarify the distinction from the pin member 11 and the clamp member 13, the shoulder member 12 is hatched in a shading manner.

First, a worker (operator) places the to-be-joined object 60 on the support surface 56a of the backing member 56. Then, the worker operates the user interface 32 to input welding execution of the to-be-joined object 60 to the controller 51. Note that a robot may place the to-be-joined object 60 on the support surface 56a of the backing member 56.

Then, as illustrated in FIG. 4, the controller 51 drives the rotary actuator 57 so that the pin member 11 and the shoulder member 12 rotate at a given first rotational speed set beforehand (for example, 200 to 3000 rpm) (Step S101; see PROCESS (1) in FIG. 5A).

Next, the controller 51 drives the linear actuator 53 (the shoulder actuator 532), while the pin member 11 and the shoulder member 12 being rotating, so that the pin member 11, the shoulder member 12, and the clamp member 13 are brought closer to the to-be-joined object 60 and the tip-end surface 11a of the pin member 11, the tip-end surface 12a of the shoulder member 12, and the tip-end surface 13a of the clamp member 13 (not illustrated in FIGS. 5A and 5B) contact a surface 60c of the to-be-joined object 60 (a joining part Wa of the to-be-joined object 60) (Step S102; see PROCESS (2) in FIG. 5A).

At this time, the controller 51 controls the linear actuator 53 (the shoulder actuator 532) so that the pin member 11, the shoulder member 12, and the clamp member 13 press the to-be-joined object 60 by a given pressing force set beforehand (for example, a given value within the range of 3 kN to 15 kN).

Thus, the first member 61 and the second member 62 are sandwiched by the clamp member 13 and the backing member 56, and the clamp member 13 is biased toward the surface 60c of the to-be-joined object 60 by contraction of the clamp actuator 41 to generate a clamping force.

Further, in this state, since both the pin member 11 and the shoulder member 12 do not move linearly, they "pre-heat" the surface 60c of the to-be-joined object 60. Thus, the constituent material of the first member 61 in this contact area is softened by generation of frictional heat, and a plastic flow part 60a is caused near the surface 60c of the to-be-joined object 60.

Next, the controller 51 drives the linear actuator 53 so that the tip-end surface 11a of the pin member 11 is sunk with respect to the tip-end surface 12a of the shoulder member 12 (Step S103). At this time, the controller 51 may drive the linear actuator 53 (the pin actuator 531) so that the pin member 11 separates from the to-be-joined object 60. Further, the controller 51 may drive the linear actuator 53 (the shoulder actuator 532) so that the shoulder member 12 is pressed into the to-be-joined object 60.

Therefore, the tip-end part of the shoulder member 12 is pressed into the joining part of the to-be-joined object 60 while being rotated.

Next, the controller 51 acquires positional information on the tip-end surface 12a (tip end) of the shoulder member 12 from the position detector 33 (Step S104). Then, the controller 51 determines whether the positional information on the tip end of the shoulder member 12 acquired at Step S104 reaches a given first position set beforehand (Step S105).

Here, the first position may be set beforehand based on an experiment etc., and is an arbitrary position within the second member 62. In more detail, the first position is an arbitrary position between a contact surface 62a of the second member 62 with the first member 61 (the surface of the second member 62 which opposes to the tip-end surface 12a of the shoulder member 12), and a position 0.3 mm away from the contact surface 62a.

Further, in terms of removing the deposit (plating film) or the oxide film formed on the second member 62 and forming a newly formed surface, the first position may be a position away from the contact surface 62a by 0.008 mm or more, or may be a position away from the contact surface 62a by 0.01 mm or more. Moreover, in terms of suppressing wear (damage) of the shoulder member 12, the first position may be a position away from the contact surface 62a by 0.25 mm or less, or may be a position away from the contact surface 62a by 0.20 mm or less, or may be a position away from the contact surface 62a by 0.10 mm or less.

Further, in terms of removing the deposit (plating film) or the oxide film formed on the second member 62 and forming the newly formed surface, the first position may be a position away from the deposit (plating film) or the oxide film formed on the second member 62 by 0.20 mm or less, or may be a position away from the deposit (plating film) or the oxide film formed on the second member 62 by 0.10 mm or less.

Therefore, the tip-end surface 12a of the shoulder member 12 reaches the arbitrary position away from the contact surface 62a of the second member 62 by 0.3 mm or less (that is, the first position). Further, the newly formed surface is formed in a part of the second member 62 which is in contact with the shoulder member 12, and/or a part of the second member 62 which is in contact with the plastic flow part 60a.

Note that, since the softened material of the plastic flow part 60a is pushed away by the shoulder member 12, and it flows immediately below the pin member 11 from immediately below the shoulder member 12, the pin member 11 retreats so that it floats with respect to the shoulder member 12 (see PROCESS (3) in FIG. 5A).

If the controller 51 determines that the positional information on the tip-end surface 12a of the shoulder member 12 acquired at Step S104 has not reached the first position (No at Step S105), it returns to Step S104, and repeats the processings of Steps S104 and S105 until it determines that the positional information on the tip-end surface 12a of the shoulder member 12 acquired at Step S104 reaches the first position.

On the other hand, if the controller 51 determines that the positional information on the tip-end surface 12a of the shoulder member 12 acquired at Step S104 reaches the first position (Yes at Step S105), it performs processing of Step S106.

Note that, if the tip-end surface 12a of the shoulder member 12 reaches the first position, the controller 51 drives the linear actuator 53 (the shoulder actuator 532) so that the tip-end surface 12a is located at the first position. In detail, the controller 51 drives the linear actuator 53 so that the advancement of the shoulder member 12 is stopped.

At Step S106, the controller 51 measures a period of time "t" after it determines that the tip-end surface 12a of the shoulder member 12 reaches the first position. Next, the controller 51 determines whether the time t measured at Step S106 has passed a given first period of time set beforehand (Step S107).

Here, the first time may be set beforehand by an experiment etc. In terms of making the welding strength of the joining part of the to-be-joined object 60 high enough, the first time may be, for example, longer than 0 seconds, and it may be 0.5 seconds or more. Further, in terms of shortening the welding time of the to-be-joined object 60, the first time may be less than 2 seconds.

If the controller 51 determines that the time t measured at Step S106 has not passed the first time (No at Step S107), it performs the processings of Steps S106 and S107 until it determines that the time t measured at Step S106 passes the first time.

On the other hand, if the controller 51 determines that the time t measured at Step S106 has passed the first time (Yes at Step S107), it performs processing of Step S108.

At Step S108, the controller 51 drives the linear actuator 53 (the pin actuator 531) so that the pin member 11 advances toward the to-be-joined object 60, and/or the controller 51 drives the linear actuator 53 (the pin actuator 531) so that the shoulder member 12 separates from the to-be-joined object 60.

In detail, the controller 51 controls the linear actuator 53 so that the tip-end surface 11*a* of the pin member 11 and the tip-end surface 12*a* of the shoulder member 12 become flush to the extent with almost no height difference.

At this time, in terms of transferring the shape of the tip-end part 120 to the surface (upper surface) 60*c* of the to-be-joined object 60, the controller 51 may control the linear actuator 53 so that the tip-end surface 11*a* of the pin member 11 and the tip-end surface 12*a* of the shoulder member 12 are located at a given second position set beforehand within the first member 61 of the to-be-joined object 60.

Further, the controller 51 may control the linear actuator 53 so that the tip-end surface 11*a* of the pin member 11 is located at the surface 60*c* of the to-be-joined object 60 and the tip-end surface 12*a* of the shoulder member 12 is located at the second position within the first member 61 of the to-be-joined object 60.

Here, the second position can be set beforehand by an experiment etc. In terms of transferring the shape of the tip-end part 120 to the surface (upper surface) 60*c* of the to-be-joined object 60, the second position may be a position, for example, below (inward of) the surface 60*c* of the to-be-joined object 60 by a dimension corresponding to the height h of the tip-end part 120. Further, in terms of reducing the height of irregularity of the surface 60*c* of the to-be-joined object 60, the second position may be a position, for example, below (inward of) the surface 60*c* of the to-be-joined object 60 by a half (½) of the dimension of the height h of the tip-end part 120.

Further, in the state where the tip end of the rotating shoulder member 12 reaches the second position, the controller 51 may let the shoulder member 12 stay at the second position for a given second period of time set beforehand. Here, the second time can be set beforehand by an experiment. In terms of transferring the shape of the tip-end part 120 to the surface (upper surface) 60*c* of the to-be-joined object 60, the second time may be, for example, longer than 0 seconds, and it may be 0.5 seconds or more. Further, in terms of shortening the welding time of the to-be-joined object 60, the second time may be less than 2 seconds.

Therefore, the pin member 11 advances gradually toward the first member 61, and the shoulder member 12 retreats from the first member 61. At this time, the softened part of the plastic flow part 60*a* flows from immediately below the pin member 11 to immediately below the shoulder member 12 (a recess produced by the press-in of the shoulder member 12).

Then, the tip-end surface 11*a* of the pin member 11 and the tip-end surface 12*a* of the shoulder member 12 move to near the surface 60*c* of the to-be-joined object 60. Therefore, the shape of the tip-end part 120 is stamped onto (transferred to) the surface 60*c* of the to-be-joined object 60 (see PROCESS (4) in FIG. 5B).

Note that, in the processings of Step S103 and/or S108, when the area of the tip-end surface of the pin member 11 is Ap, the area of the tip-end surface of the shoulder member 12 is As, the pressed-in depth of the pin member 11 is Pp, and the pressed-in depth of the shoulder member 12 is Ps, the controller 51 is preferred to control the linear actuator 53 so that an absolute value of a tool mean position Tx defined by the following Formula (I) becomes smaller, and it is more preferred to control the linear actuator 53 so that the tool mean position Tx becomes 0 (Tx=0).

$$Ap \cdot Pp + As \cdot Ps = Tx \qquad (I)$$

Note that, as for the concrete control for reducing the absolute value of the tool mean position Tx, since it is disclosed in detail in JP2012-196682A, the explanation is omitted herein.

Further, in the processing of Step S108, the controller 51 may control the linear actuator 53 so that the tip-end surface 11*a* of the pin member 11 is located at the first position. In this case, after the tip-end surface 11*a* of the pin member 11 is located at the first position, the controller 51 may control the linear actuator 53 so that the tip-end surface 11*a* of the pin member 11 and the tip-end surface 12*a* of the shoulder member 12 become flush.

Next, the controller 51 drives the linear actuator 53 so that the pin member 11, the shoulder member 12, and the clamp member 13 separate from the to-be-joined object 60 (Step S109). Then, the controller 51 controls the rotary actuator 57 to stop the rotation of the pin member 11 and the shoulder member 12 (Step S110; see PROCESS (5) in FIG. 5B), and ends this program (welding process of the to-be-joined object 60).

Therefore, since the rotation (and the pressing) by the contact of the pin member 11 and the shoulder member 12 is no longer applied to the first member 61 and the second member 62, the plastic flow stops in the plastic flow part 60*a*, and the plastic flow part 60*a* and the newly formed surface of the second member 62 are joined.

Note that the joining part Wa of the to-be-joined object 60 formed by the friction stirring welding apparatus 50 according to Embodiment 1 is one example of the joint structure according to Embodiment 1. In detail, an annular recess 60*b* is formed in the joining part Wa of the to-be-joined object 60.

Further, in Embodiment 1, since the outer circumferential surface 12*b* and the inner circumferential surface 12*c* of the tip-end part 120 of the shoulder member 12 incline, an inner wall of the recess 60*b* is formed so as to be bent (see PROCESS (5) in FIG. 5B). That is, the shape of the tip-end part 120 of the shoulder member 12 is stamped onto (transferred to) the recess 60*b*.

Therefore, according to the shape of the tip-end part 120 of the shoulder member 12, the inner wall of the recess 60*b* can be formed so that it is inclined, curved, or bent.

In the friction stir spot welding apparatus 50 according to Embodiment 1 configured in this way, the tip-end part 120 of the shoulder member 12 is formed in the tapered shape.

Thus, if the wear does not occur in the tip-end part 120 of the shoulder member 12, the shape of the tip-end part 120 is stamped onto (transferred to) the surface 60*c* of the to-be-joined object 60 (joining part) when carrying out the friction stir spot welding of the to-be-joined object 60. On the other hand, if the wear occurs in the tip-end part 120 of the shoulder member 12, the shape of the tip-end part 120 is not stamped onto the surface of the to-be-joined object 60, but the surface 60c becomes flat.

Thus, by inspecting (visually inspecting) the surface of the to-be-joined object 60 after the friction stir spot welding is finished, one can judge whether the tip-end part 120 of the shoulder member 12 is worn.

Therefore, it becomes unnecessary to periodically remove the tool (the pin member 11, the shoulder member 12, and the clamp member 13) from the friction stir spot welding apparatus 50, and to inspect the abrasion state of the tool.

In the friction stir spot welding apparatus 50 according to Embodiment 1, since the tip-end part 120 is formed in the tapered shape, the area of the tip-end surface 12a of the shoulder member 12 becomes smaller, as compared with the conventional shoulder member 12 without having the taper shape, thereby increasing the surface pressure.

Thus, the friction stir spot welding apparatus 50 according to Embodiment 1 can shorten the time until the tip-end surface 12a of the shoulder member 12 reaches the first position, as compared with the conventional friction stir spot welding apparatus.

Meanwhile, when the second member 62 of the to-be-joined object 60 has a deposit, such as an alloyed hot-dip galvanized steel plate, when it has an oxide film formed on the surface, or when it has sealant material disposed on the surface, it is necessary to remove impurities (for example, zinc etc.) which form the deposit (plating film) or the oxide film, and to form a newly formed surface, in order to join the to-be-joined object 60.

In the friction stir spot welding apparatus 50 according to Embodiment 1, since the tip-end part 120 is formed in the tapered shape, it can promote a flow of the impurities along the outer circumferential surface 12b and/or the inner circumferential surface 12c of the tip-end part 120 of the shoulder member 12.

Thus, in the friction stir spot welding apparatus 50 according to Embodiment 1, the time during which the tip-end surface 12a of the shoulder member 12 stays at the first position in order to join the to-be-joined object 60 with a sufficient welding strength can be 2 seconds or less, as compared with the conventional friction stir spot welding apparatus.

Therefore, in the friction stir spot welding apparatus 50 according to Embodiment 1, the welding time of the to-be-joined object 60 can be shortened as compared with the conventional friction stir spot welding apparatus.

The friction stir spot welding apparatus according to Embodiment 1 is the friction stir spot welding apparatus which joins the to-be-joined object by softening it with the frictional heat. The friction stir spot welding apparatus includes the pin member formed in the solid cylindrical shape, the shoulder member which is formed in the hollow cylindrical shape and in which the pin member is inserted, the rotary actuator which rotates the pin member and the shoulder member on the axis which is in agreement with the axial center of the pin member, and the linear actuator which linearly moves each of the pin member and the shoulder member along the axis. The tip-end part of the shoulder member is formed in the tapered shape.

Further, in the friction stir spot welding apparatus according to Embodiment 1, the tip-end surface of the shoulder member and the tip-end surface of the pin member may be in agreement with each other, when seen horizontally.

Moreover, in the friction stir spot welding apparatus according to Embodiment 1, the outer circumferential surface of the tip-end part of the shoulder member may be inclined, curved, or bent.

Further, in the friction stir spot welding apparatus according to Embodiment 1, the outer circumferential surface of the tip-end part of the shoulder member may be inclined, and the tip-end part of the shoulder member may be configured so that the angle formed between the tip-end surface of the shoulder member and the inclined surface of the shoulder member is 6° or more and less than 45°, when seen horizontally.

Moreover, in the friction stir spot welding apparatus according to Embodiment 1, the inner circumferential surface of the tip-end part of the shoulder member may be inclined, curved, or bent.

Further, in the friction stir spot welding apparatus according to Embodiment 1, the inner circumferential surface of the tip-end part of the shoulder member may be inclined, and the tip-end part of the shoulder member may be configured so that the angle formed between the tip-end surface of the shoulder member and the inclined surface of the shoulder member is 6° or more and less than 45°, when seen horizontally.

Further, in the friction stir spot welding apparatus according to Embodiment 1, the to-be-joined object may include the first member and the second member, the first member being disposed so that it opposes to the pin member and the shoulder member, and being made of the material with the melting point lower than the second member. The friction stir spot welding apparatus may further be provided with the controller. The controller may be adapted to perform:

(A) in which the rotary actuator and the linear actuator are operated so that the pin member and the shoulder member press the joining part of the to-be-joined object, while the pin member and the shoulder member rotate;

(B) in which the linear actuator and the rotary actuator are operated so that the tip end of the rotating shoulder member reaches the given first position set beforehand within the second member, and the rotating pin member retreats from the joining part of the to-be-joined object;

(C) in which, after (B), the tip end of the rotating shoulder member stays in a state where the tip end of the shoulder member reaches the first position, for the given first time set beforehand; and (D) in which, after (C), the rotary actuator and the linear actuator are operated so that the rotating shoulder member is drawn out from the joining part of the to-be-joined object, and the rotating pin member is advanced toward the joining part of the to-be-joined object.

Further, in the friction stir spot welding apparatus according to Embodiment 1, when performing (D), the controller may operate the rotary actuator and the linear actuator so that the tip end of the shoulder member reaches the given second position set beforehand within the first member.

Further, in the friction stir spot welding apparatus according to Embodiment 1, in (D), the controller may cause the tip end of the rotating shoulder member to stay in the state where the tip end of the shoulder member has reached the second position for the given second time set beforehand.

Further, in the friction stir spot welding apparatus according to Embodiment 1, after (D), the controller may perform (E) in which the rotary actuator and the linear actuator are operated so that the rotating pin member and the rotating shoulder member are drawn out from the joining part of the to-be-joined object.

Further, in the friction stir spot welding apparatus according to Embodiment 1, the joining part may further include the third member disposed between the first member and the second member.

Further, in the friction stir spot welding apparatus according to Embodiment 1, the first time may be a period of time for 0 seconds or more and less than 2 seconds.

Further, in the friction stir spot welding apparatus according to Embodiment 1, the first position may be a position away from the principal surface of the second member on the side which opposes to the tip-end surface of the shoulder member, by 0.3 mm or less.

Further, the joint structure according to Embodiment 1 is the joint structure which is formed by the friction stir spot welding apparatus carrying out friction stir spot welding of the to-be-joined object including the first member and the second member at the joining part. The first member is made of material with the melting point lower than the second member. The first member and the second member are disposed in this order. The annular recess is formed in the surface of the joining part. The bottom surface of the recess is inclined, curved, or bent.

Further, in the joint structure according to Embodiment 1, the friction stir spot welding apparatus may be provided with the pin member formed in the solid cylindrical shape and the shoulder member formed in the hollow cylindrical shape, the pin member being inserted. The joint structure may be formed by the tip end of the shoulder member while being rotated staying in the state where the tip end of the shoulder member reaches the given first position set beforehand within the second member, for the given first period of time set beforehand.

[Modification 1]

Next, a modification of the friction stir spot welding apparatus 50 according to Embodiment 1 is described.

Figure 6:
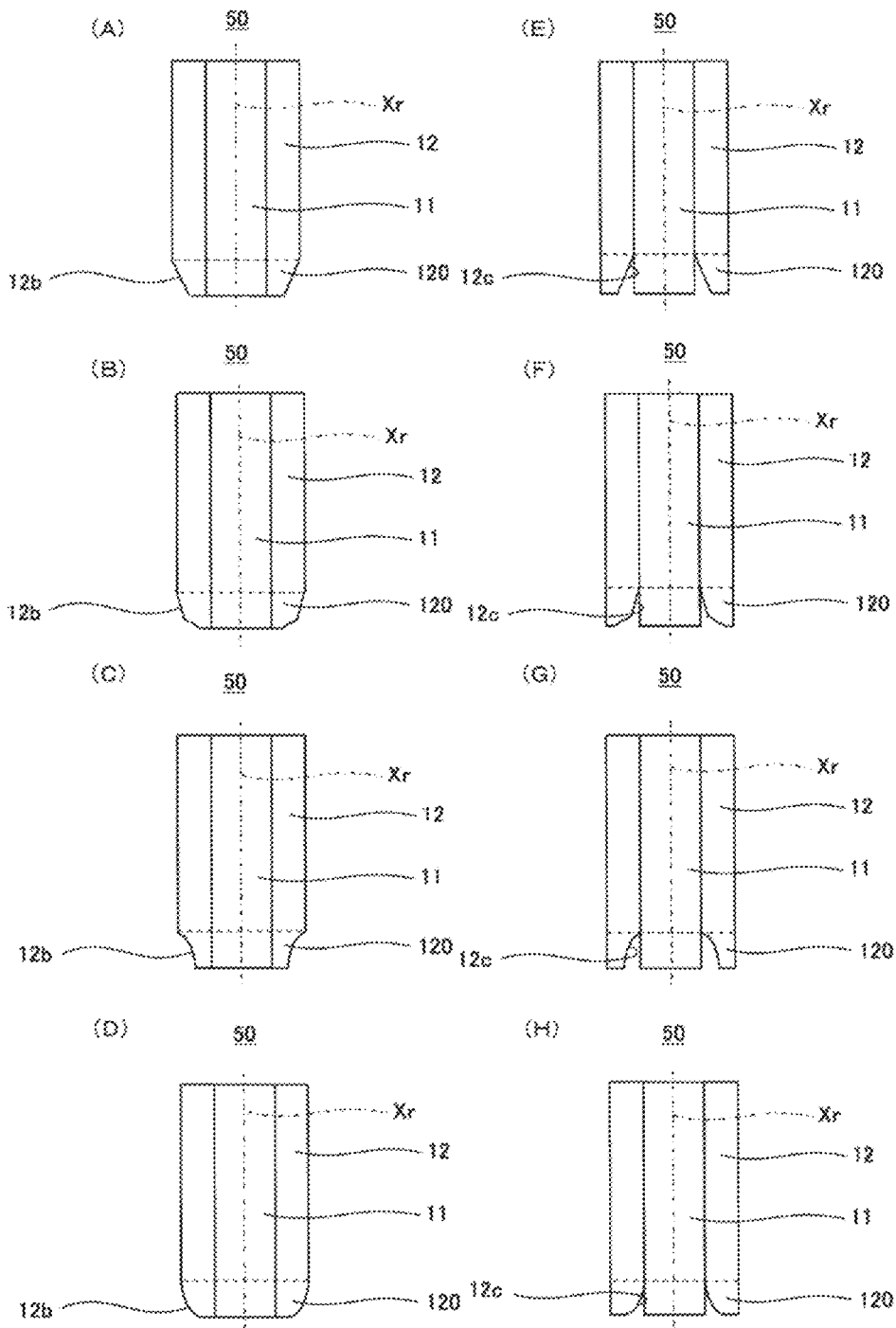
FIG. 6 is a schematic diagram in which a substantial part of a friction stir spot welding apparatus of Modification 1 of Embodiment 1 is enlarged.

FIG. 6 is a schematic diagram in which a substantial part of a friction stir spot welding apparatus of Modification 1 of Embodiment 1 is enlarged. FIGS. 6(A) to 6(D) illustrate aspects in which the outer circumferential surface of the tip-end part of the shoulder member is formed so that it is inclined, curved, or bent. FIGS. 6(E) to 6(H) illustrate aspects in which the inner circumferential surface of the tip-end part of the shoulder member is formed so that it is inclined, curved, or bent.

As illustrated in FIG. 6(A), as for the friction stir spot welding apparatus 50 of Modification 1, the outer circumferential surface 12b of the tip-end part 120 of the shoulder member 12 may be formed so that it is inclined. In more detail, the cross-sectional shape of the outer circumferential surface 12b of the tip-end part 120 (a cross section along the axis Xr) when seen horizontally may be formed so that it is inclined with respect to the axis Xr.

As illustrated in FIG. 6(B), as for the friction stir spot welding apparatus 50 of Modification 1, the outer circumferential surface 12b of the tip-end part 120 of the shoulder member 12 may be formed so that it is bent. In more detail, the cross-sectional shape of the outer circumferential surface 12b of the tip-end part 120 may be formed so that it is bent when seen horizontally. Note that, although in FIG. 6(B) the number of bending points is one, the number of bending points may be two or more.

Further, as illustrated in FIG. 6(C), as for the friction stir spot welding apparatus 50 of Modification 1, the outer circumferential surface 12b of the tip-end part 120 of the shoulder member 12 may be formed so that it is curved (in an arc). In more detail, the cross-sectional shape of the outer circumferential surface 12b of the tip-end part 120 may be formed so that it is curved when seen horizontally.

Further, as illustrated in FIG. 6(D), as for the friction stir spot welding apparatus 50 of Modification 1, the outer circumferential surface 12b of the tip-end part 120 of the shoulder member 12 may be formed so that it is curved. In more detail, the cross-sectional shape of the outer circumferential surface 12b of the tip-end part 120 may be formed so that it is curved when seen horizontally. Here, the term "curve" of the "being curved" is a curve of a function represented by a higher-order function, such as a quadratic function or a cubic function, an exponential function, or a logarithmic function.

Further, as illustrated in FIG. 6(E), as for the friction stir spot welding apparatus 50 of Modification 1, the inner circumferential surface 12c of the tip-end part 120 of the shoulder member 12 may be formed so that it is inclined. In more detail, the cross-sectional shape of the inner circumferential surface 12c of the tip-end part 120 (a cross section along the axis Xr) may be formed so that it is inclined to the axis Xr when seen horizontally.

Further, as illustrated in FIG. 6 (F), as for the friction stir spot welding apparatus 50 of Modification 1, the inner circumferential surface 12c of the tip-end part 120 of the shoulder member 12 may be formed so that it is bent. In more detail, the cross-sectional shape of the inner circumferential surface 12c of the tip-end part 120 may be formed so that it is bent when seen horizontally. Note that, although in FIG. 6(F) the number of bending points is one, the number of bending points may be two or more.

Further, as illustrated in FIG. 6(G), as for the friction stir spot welding apparatus 50 of Modification 1, the inner circumferential surface 12c of the tip-end part 120 of the shoulder member 12 may be formed so that it is curved (in an arc). In more detail, the cross-sectional shape of the inner circumferential surface 12c of the tip-end part 120 may be formed so that it is curved when seen horizontally.

Further, as illustrated in FIG. 6(H), as for the friction stir spot welding apparatus 50 of Modification 1, the inner circumferential surface 12c of the tip-end part 120 of the shoulder member 12 may be formed so that it is curved. In more detail, the cross-sectional shape of the inner circumferential surface 12c of the tip-end part 120 may be formed so that it is curved when seen horizontally. Here, the term "curve" of the "being curved" is a curve of a function represented by a higher-order function, such as a quadratic function or a cubic function, an exponential function, or a logarithmic function.

The friction stir spot welding apparatus 50 of Modification 1 configured in this way also has similar operation and effects to the friction stir spot welding apparatus 50 according to Embodiment 1.

Embodiment 2

A friction stir spot welding apparatus according to Embodiment 2 is configured so that the tip-end surface of the shoulder member of the friction stir spot welding apparatus according to Embodiment 1 (including its modifications) projects more than the tip-end surface of the pin member when seen horizontally.

Below, one example of the friction stir spot welding apparatus according to Embodiment 2 is described in detail with reference to the drawings.

[Configuration of Friction Stir Spot Welding Apparatus]

Figure 7:
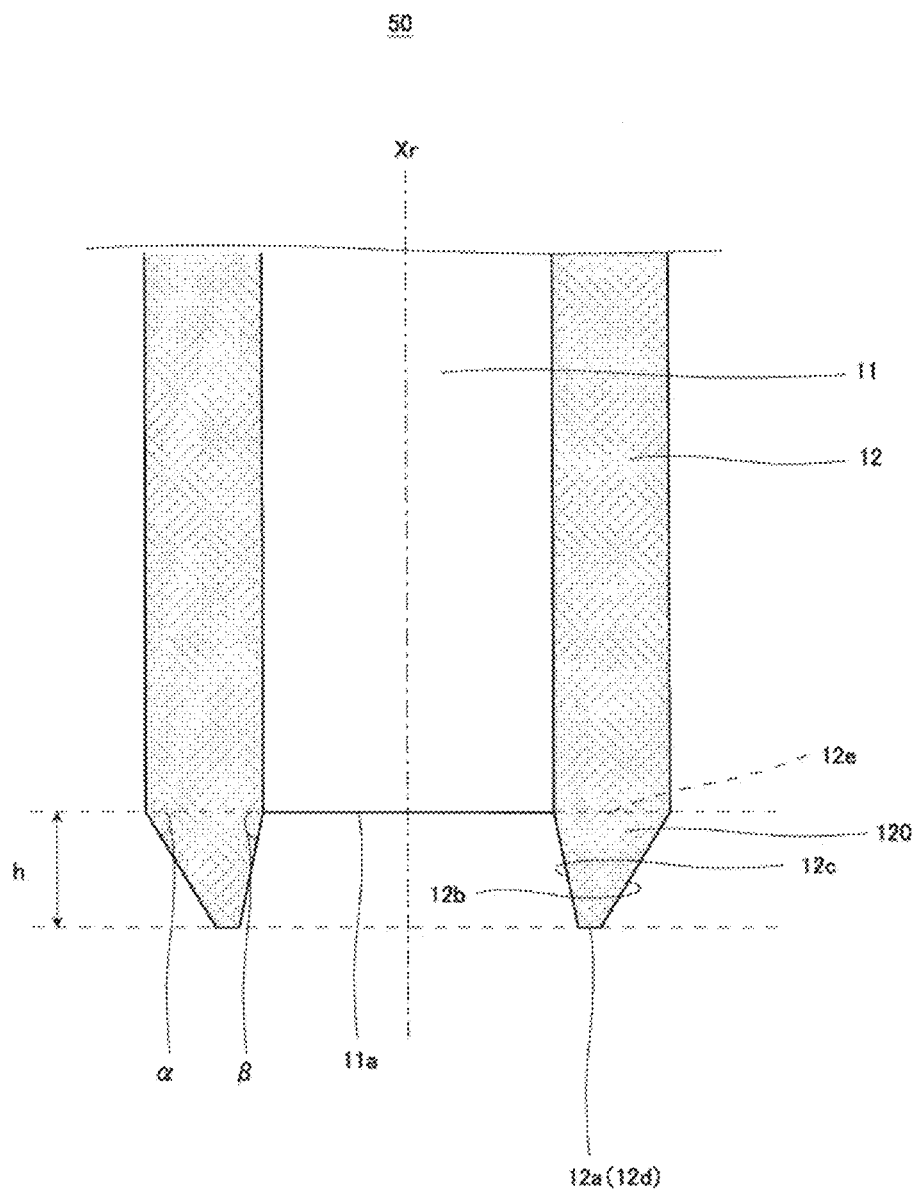
FIG. 7 is a schematic diagram illustrating an outline configuration of a substantial part of a friction stir spot welding apparatus according to Embodiment 2.

FIG. 7 is a schematic diagram illustrating an outline configuration of a substantial part of the friction stir spot welding apparatus according to Embodiment 2.

As illustrated in FIG. 7, the friction stir spot welding apparatus 50 according to Embodiment 2 has the same fundamental configuration as the friction stir spot welding apparatus 50 according to Embodiment 1, but it differs in that the tip-end surface 12a of the shoulder member 12 is configured to project more than the tip-end surface 11a of the pin member 11 when seen horizontally.

Note that, in FIG. 7, the outer circumferential surface 12b and the inner circumferential surface 12c of the tip-end part 120 of the shoulder member 12 are formed so that they are inclined when seen horizontally.

Further, the outer circumferential surface 12b and the inner circumferential surface 12c of the tip-end part 120 of the shoulder member 12 may be formed at the same inclination angle when seen horizontally. Moreover, an inclination angle α of the outer circumferential surface 12b of the tip-end part 120 may be larger than an inclination angle β of the inner circumferential surface 12c of the tip-end part 120. Alternatively, the inclination angle α of the outer circumferential surface 12b of the tip-end part 120 may be smaller than the inclination angle β of the inner circumferential surface 12c of the tip-end part 120.

Here, the inclination angle α of the outer circumferential surface 12b of the tip-end part 120 and the inclination angle β of the inner circumferential surface 12c of the tip-end part 120 are described with reference to FIGS. 8A and 8B.

Figure 8A:
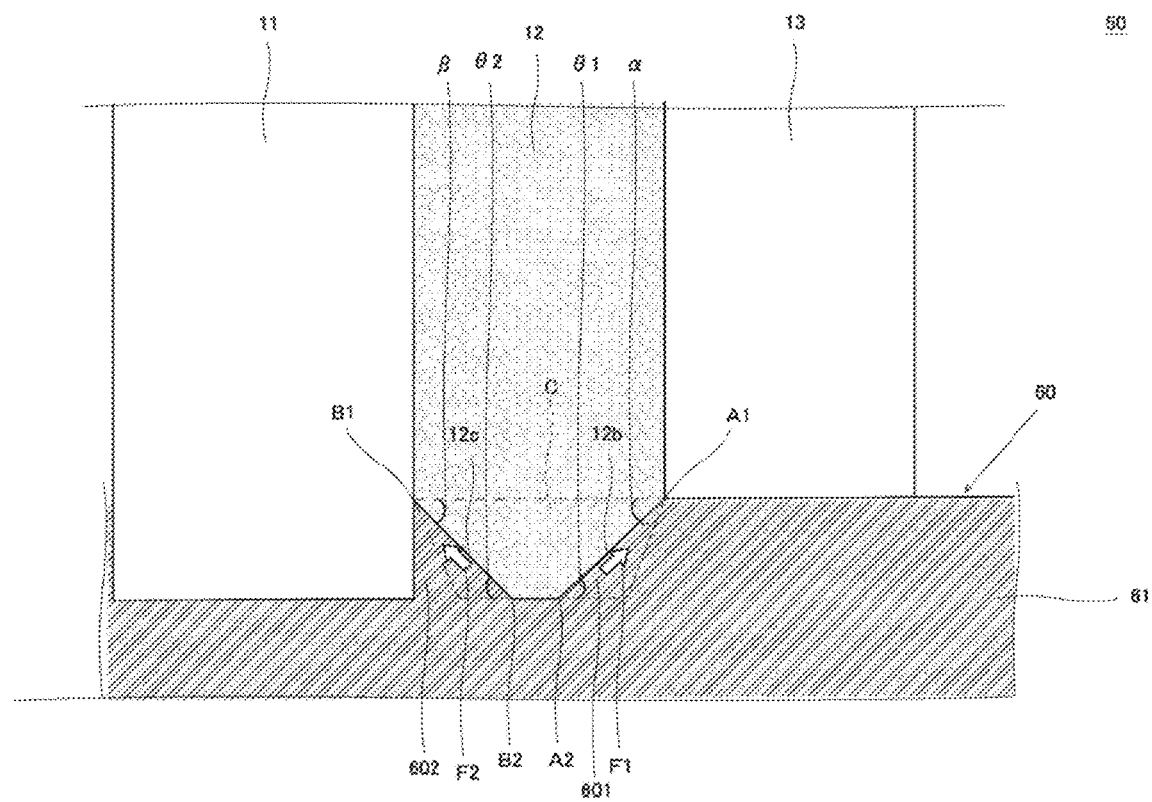
FIG. 8A is a schematic diagram illustrating an outline configuration of tip-end parts of a pin member, a shoulder member, and a clamp member of the friction stir spot welding apparatus.

FIG. 8A is a schematic diagram illustrating an outline configuration of the tip-end parts of the pin member, the shoulder member, and the clamp member of the friction stir spot welding apparatus. FIG. 8B is a view in which a shearing force which acts on the transferring part of the to-be-joined object is broken down.

As illustrated in FIG. 8A, a part of the joining part Wa of the to-be-joined object 60 to which the shape of the outer circumferential surface 12b of the tip-end part 120 of the shoulder member 12 is transferred is a transferring part 601. Further, a protruded part formed in the joining part Wa of the to-be-joined object 60 by the inner circumferential surface 12c of the tip-end part 120 of the shoulder member 12 and the tip-end part of the pin member 11 is a transferring part 602.

Note that the inclination angle α of the outer circumferential surface 12b of the tip-end part 120 is an angle formed between an imaginary line C which is a line perpendicular to the axis Xr and a line which connects an end A1 on the base-end side (upper-end side) where the outer circumferential surface 12b is inclined and an end A2 on the tip-end side (lower-end side).

Similarly, the inclination angle β of the inner circumferential surface 12c of the tip-end part 120 is an angle formed between the imaginary line C and a line which connects an end B1 on the base-end side (upper-end side) where the inner circumferential surface 12c is inclined and an end B2 on the tip-end side (lower-end side).

Thus, as for the outer circumferential surface 12b and the inner circumferential surface 12c of the tip-end part 120, when they are, for example, curved, as illustrated in the modification of Embodiment 1, the lines which connect the base-end part and the tip-end part of the curve etc., with the imaginary line C, correspond to the inclination angle α and the inclination angle β, respectively.

As illustrated by a one-dot chain line in FIG. 8A, as the inclination angle α of the outer circumferential surface 12b increases, an angle θ1 of the inclined surface of the transferring part 601 also increases. As the angle θ1 of the inclined surface of the transferring part 601 increases, the base of the transferring part 601 (an area of the bottom surface) decreases, and the transferring part 601 may be partially missing (torn).

Similarly, as the inclination angle β of the inner circumferential surface 12c increases, an angle θ2 of the inclined surface of the transferring part 602 also increases. As the angle θ2 of the inclined surface of the transferring part 602 increases, the base of the transferring part 602 (an area of the bottom surface) decreases, and the transferring part 602 may be partially missing (torn).

Further, when separating the tip-end part of the pin member 11 and the tip-end part of the shoulder member 12 from the to-be-joined object 60, shearing forces F1 and F2 act on the inclined surface of the transferring part 601 (a contact surface with the outer circumferential surface 12b) and the inclined surface of the transferring part 602 (a contact surface with the inner circumferential surface 12c), respectively.

Figure 8B:
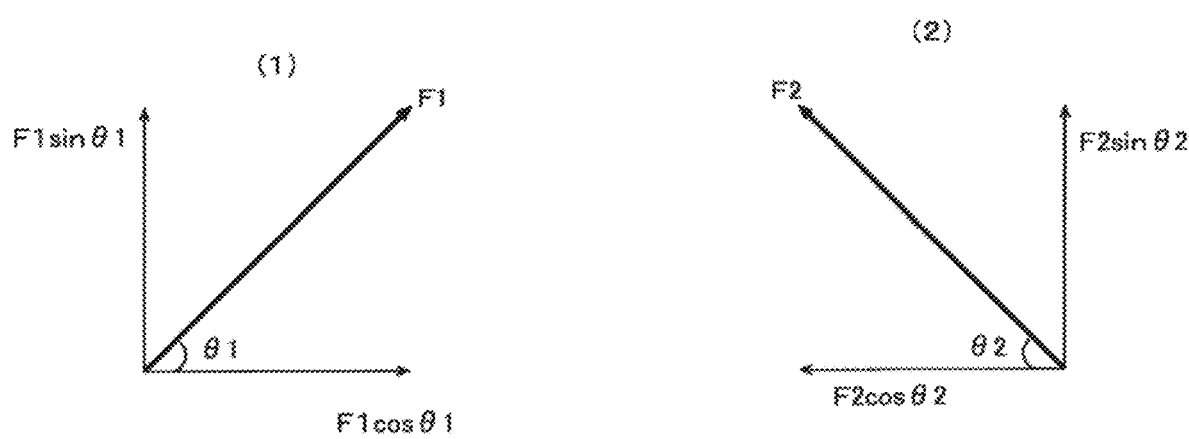
FIG. 8B is a view in which a shearing force which acts on a transferring part of a to-be-joined object is broken down.

As illustrated in FIG. 8B(1), F1 sin θ1 acts as a force which partially tears off the transferring part 601. Similarly, F2 sin θ2 acts as a force which partially tears off the transferring part 602 (see FIG. B8(2)). Here, when θ1=45°, F1 sin θ1=F1 cos θ1. Similarly, when θ2=45°, F2 sin θ2=F2 cos θ2. Further, θ1=inclination angle α, and θ2=inclination angle β.

Thus, when θ1<45° (i.e., the inclination angle α<45°), generation of the partial tearing-off of the transferring part 601 can be suppressed. Similarly, when θ2<45° (i.e., the inclination angle β<45°), generation of the partial tearing-off of the transferring part 602 can be suppressed.

Therefore, the inclination angle α of the outer circumferential surface 12b of the tip-end part 120 is preferably less than 45°, and the inclination angle β of the inner circumferential surface 12c of the tip-end part 120 is preferably less than 45°.

Further, from the results of Test Example 1 and Test Example 2 which will be described later, the inclination angle α may be 32° or less, or may be 17° or less, or may be 12° or less, or may be 6° or less. Similarly, the inclination angle β may be 32° or less, or may be 17° or less, or may be 12° or less, or may be 6° or less.

The friction stir spot welding apparatus 50 according to Embodiment 2 configured in this way also has similar operation and effects to the friction stir spot welding apparatus 50 according to Embodiment 1.

Embodiment 3

A friction stir spot welding apparatus according to Embodiment 3 is a friction stir spot welding apparatus which joins the to-be-joined object by softening it with the frictional heat. The friction stir spot welding apparatus includes the pin member formed in the solid cylindrical shape, the shoulder member which is formed in the hollow cylindrical shape and in which the pin member is inserted, the rotary actuator which rotates the pin member and the shoulder member on the axis which is in agreement with the axial center of the pin member, and the linear actuator which linearly moves each of the pin member and the shoulder member along the axis. A recess extending in the circumferential direction is formed in the tip-end surface of the shoulder member.

Below, one example of the friction stir spot welding apparatus according to Embodiment 3 is described in detail with reference to the drawings.

[Configuration of Friction Stir Spot Welding Apparatus]

Figure 9:
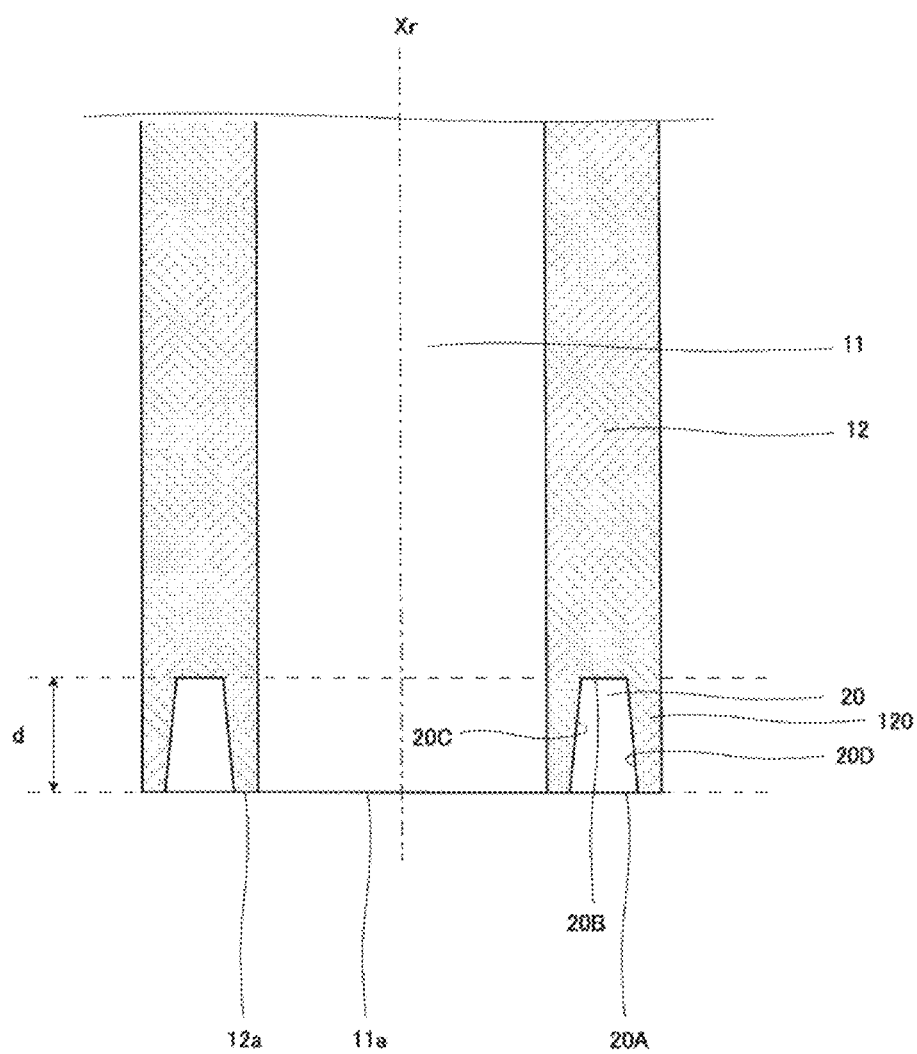
FIG. 9 is a schematic diagram illustrating an outline configuration of a substantial part of a friction stir spot welding apparatus according to Embodiment 3.

FIG. 9 is a schematic diagram illustrating an outline configuration of a substantial part of the friction stir spot welding apparatus according to Embodiment 3.

As illustrated in FIG. 9, the friction stir spot welding apparatus 50 according to Embodiment 3 has the same fundamental configuration as the friction stir spot welding apparatus 50 according to Embodiment 1, but it differs in that a recess 20 extending in the circumferential direction (annularly) is formed in the tip-end surface 12a of the shoulder member 12.

The recess 20 may be formed so that the area of an opening 20A becomes larger than the area of a bottom surface 20B. Further, among an inner circumferential surface 20C and an outer circumferential surface 20D of the recess 20, at least one circumferential surface may be formed so that it is parallel to the axis Xr. Moreover, among the inner circumferential surface 20C and the outer circumferential surface 20D of the recess 20, at least one circumferential surface may be formed so that it is inclined, curved, or bent.

Further, in terms of stamping (transferring) the shape of the tip-end part 120 onto the surface of the to-be-joined object 60, a depth d of the recess 20 may be 0.05 mm or more, or may be 5% or more of the thickness of the first member 61, for example. Moreover, in terms of suppressing the damage of the tip-end part 120 of the shoulder member 12, the depth d may be 0.5 mm or less, or may be 50% or less of the thickness of the first member 61, for example.

The friction stir spot welding apparatus 50 according to Embodiment 3 configured in this way also has similar operation and effects to the friction stir spot welding apparatus 50 according to Embodiment 1.

Note that, although in Embodiment 3 the recess 20 is formed in the tip-end surface 12a of the shoulder member 12, it is not limited to this configuration. An annular recess 20 may be formed in the tip-end surface 11a of the pin member 11.

Test Examples

Next, joining tests of the to-be-joined object 60 by the friction stir spot welding apparatus 50 according to Embodiment 2 and the friction stir spot welding method disclosed in Patent Document 1 are described.

Test Example 1

The joining test of the to-be-joined object 60 is performed using the friction stir spot welding apparatus 50 according to Embodiment 2. Note that, in Test Example 1, the height of the tip-end part 120 is 0.2 mm. Further, the inclination angle α of the outer circumferential surface 12b of the tip-end part 120 is 12°, and the inclination angle β of the inner circumferential surface 12c of the tip-end part 120 is 32°.

Test Example 2

The joining test of the to-be-joined object 60 is performed using the friction stir spot welding apparatus 50 according to Embodiment 2. Note that, in Test Example 2, the height of the tip-end part 120 is 0.1 mm. Further, the inclination angle α of the outer circumferential surface 12b of the tip-end part 120 is 6°, and the inclination angle β of the inner circumferential surface 12c of the tip-end part 120 is 17°.

Comparative Example

As a comparative example, the joining test of the to-be-joined object 60 is performed by the friction stir spot welding method disclosed in Patent Document 1. In detail, as a friction stir spot welding apparatus of Comparative Example, the joining test of the to-be-joined object 60 is performed using a shoulder member 12 formed so that the inner circumferential surface and the outer circumferential surface of the tip-end part 120 become parallel to the axis Xr.

(Welding Conditions)

As the first member 61, a 1 mm aluminum plate (A6061) is used, and as the second member 62, a 1.2 mm 980 MPa-class alloyed hot-dip galvanized steel plate (GA) is used.

Note that, in Test Example 1, the first position which is a target arrival position of the shoulder member 12 is set as a position which is 0.3 mm below the contact surface (upper surface) of the second member 62 with the first member 61. Further, in Test Example 2, it is set as a position which is 0.2 mm below the contact surface (upper surface) of the second member 62 with the first member 61. Moreover, in Comparative Example, the first position which is the target arrival position of the shoulder member 12 is set as a position which is 0.1 mm below the contact surface (upper surface) of the second member 62 with the first member 61.

Further, while changing the time (the first time) for which the tip-end surface 12a of the shoulder member 12 stays at the first position after the tip-end surface 12a reached the first position between 0, 1, 2, and 3 seconds, the to-be-joined object 60 is joined. Moreover, the first rotational speed which is a rotational speed of the pin member 11 and the shoulder member 12 is set as 2,000 rpm.

Then, a tensile-shearing test (JIS Z 3136) and a cross-tensile test (JIS Z 3137) of the to-be-joined objects 60 which were joined by each of the friction stir spot welding apparatuses of Test Examples 1 and 2, and Comparative Example were performed.

(Test Results)

Figure 10:
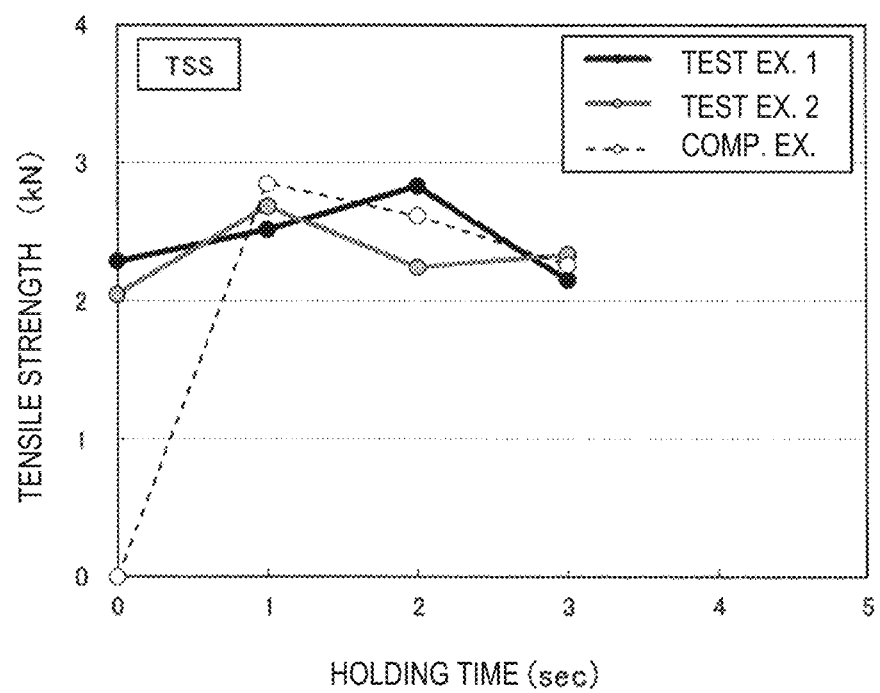
FIG. 10 illustrates graphs of results of a tensile-shearing test and a cross-tensile test of to-be-joined objects which are friction stir spot welded under the above-described welding conditions using friction stir spot welding apparatuses of Test Examples 1 and 2, and Comparative Example.
Figure 10:
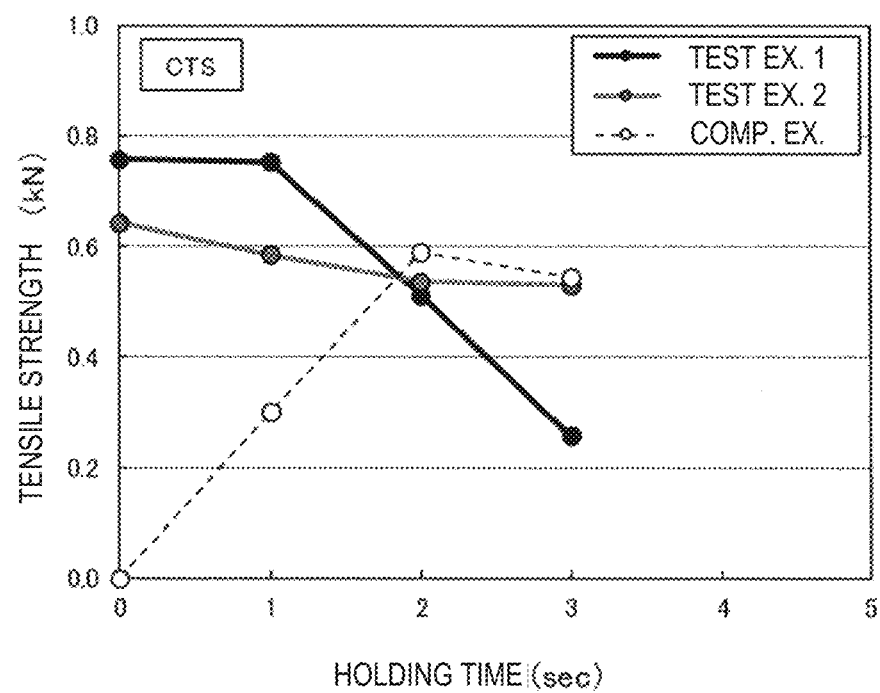
Figure 11:
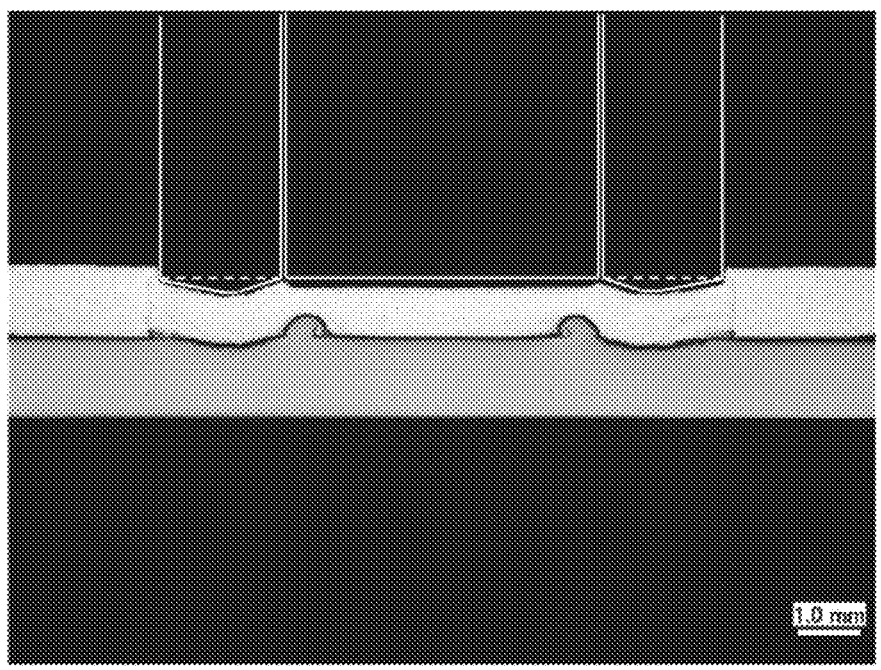
FIG. 11 illustrates a cross-sectional photograph of the to-be-joined objects which are friction stir spot welded using the friction stir spot welding apparatus of Test Example 1.

FIG. 10 illustrates graphs of the results of the tensile-shearing test and the cross-tensile test of the to-be-joined objects which are friction stir spot welded under the above-described welding conditions using the friction stir spot welding apparatuses of Test Examples 1 and 2, and Comparative Example. Further, FIG. 11 illustrates a cross-sectional photograph of the to-be-joined object which is friction stir spot welded using the friction stir spot welding apparatus of Test Example 1.

As illustrated in FIG. 10, as the friction stir spot welding was carried out using the friction stir spot welding apparatus of Comparative Example, it was not able to obtain a sufficient welding strength when the first time was 0 seconds. Further, in the tensile-shearing test (TSS) of the friction stir spot welding apparatus of Comparative Example, a sufficient welding strength was obtained when the first time was 1 second, but in the cross-tensile test (CTS), a sufficient welding strength was not obtained unless the first time was 2 seconds or more.

On the other hand, when the friction stir spot welding was carried out using the friction stir spot welding apparatuses of Test Examples 1 and 2, a sufficient welding strength was obtained even when the first time was 0 seconds.

Based on these results, the friction stir spot welding apparatus 50 according to Embodiment 1 demonstrated that the to-be-joined object 60 could be joined with the sufficient welding strength when setting the first time as 0 seconds or more and less than 2 seconds.

Further, as illustrated in FIG. 11, in a case where the wear does not occur in the tip-end part 120 of the shoulder member 12 when the friction stir spot welding was carried out using the friction stir spot welding apparatus of Test Example 1, it was demonstrated that the shape of the tip-end part 120 (the tapered shape; the transferring part) was stamped onto (transferred to) the surface 60c of the to-be-joined object 60 (joining part).

It is apparent for the person skilled in the art that many improvements or other embodiments of the present disclosure are possible from the above description. Therefore, the above description is to be interpreted only as illustration, and it is provided in order to teach the person skilled in the art the best mode for implementing the present disclosure. The details of the structures and/or the functions may be changed substantially, without departing from the present disclosure. Moreover, various inventions may be formed by suitable combinations of the plurality of components disclosed in the above embodiments.

INDUSTRIAL APPLICABILITY

The friction stir spot welding apparatus of the present disclosure is useful because one can judge the abrasion state of the tool based on the joining spot of the to-be-joined object (the surface of the joining part).

The invention claimed is:

1. A friction stir spot welding apparatus that joins a to-be-joined object by softening the object with frictional heat, comprising:
    a pin member formed in a solid cylindrical shape;
    a shoulder member formed in a hollow cylindrical shape, the pin member being configured to be inserted in the shoulder member, a tip-end part of the shoulder member being formed in a tapered shape;
    a rotary actuator configured to rotate the pin member and the shoulder member on an axis along an axial center of the pin member; and
    a linear actuator configured to linearly move each of the pin member and the shoulder member along the axis, wherein
    the to-be-joined object includes a first member and a second member, the first member being disposed so as to oppose to the pin member and the shoulder member and being made of material with a melting point lower than the second member,
    the friction stir spot welding apparatus is further provided with a controller, the controller being programmed to:
        (A) operate the rotary actuator and the linear actuator so that the pin member and the shoulder member press a joining part of the to-be-joined object while the pin member and the shoulder member rotate,
        (B) operate the linear actuator and the rotary actuator so that the tip-end part of the rotating shoulder member reaches a first position within the second member, and retreat the rotating pin member from the joining part of the to-be-joined object,
        (C), after (B), hold the tip-end part of the rotating shoulder member in a state where the tip-end part of the shoulder member reaches the first position for a first period of time, and
        (D), after (C), operate the rotary actuator and the linear actuator so that the rotating shoulder member is drawn out from the joining part of the to-be-joined object and the rotating pin member is advanced toward the joining part of the to-be-joined object.

2. The friction stir spot welding apparatus of claim 1, wherein a surface of the tip-end part of the shoulder member and a tip-end surface of the pin member are co-planer, when seen horizontally.

3. The friction stir spot welding apparatus of claim 1, wherein a surface of the tip-end part of the shoulder member projects further than a tip-end surface of the pin member, when seen horizontally.

4. The friction stir spot welding apparatus of claim 1, wherein an outer circumferential surface of the tip-end part of the shoulder member is inclined, curved, or bent.

5. The friction stir spot welding apparatus of claim 4, wherein the outer circumferential surface of the tip-end part of the shoulder member is inclined, and
    wherein the tip-end part of the shoulder member is configured so that an angle formed between a surface of the tip-end part of the shoulder member and the outer circumferential surface of the shoulder member is less than 45°, when seen horizontally.

6. The friction stir spot welding apparatus of claim 1, wherein an inner circumferential surface of the tip-end part of the shoulder member is inclined, curved, or bent.

7. The friction stir spot welding apparatus of claim 6, wherein the inner circumferential surface of the tip-end part of the shoulder member is inclined and
    wherein the tip-end part of the shoulder member is configured so that an angle formed between a surface of the tip-end part of the shoulder member and the inner circumferential surface of the shoulder member is less than 45°, when seen horizontally.

8. The friction stir spot welding apparatus of claim 1, wherein the first period of time is longer than 0 seconds and less than 2 seconds.

9. The friction stir spot welding apparatus of claim 1, wherein the first position is a position away from a contact surface of the second member with the first member, by 0.3 mm or less.

* * * * *